United States Patent
Kanekawa et al.

(10) Patent No.: US 9,811,429 B2
(45) Date of Patent: Nov. 7, 2017

(54) MICROCONTROLLER UTILIZING REDUNDANT ADDRESS DECODERS AND ELECTRONIC CONTROL DEVICE USING THE SAME

(71) Applicant: Renesas Electronics Corporation, Kawasaki-shi, Kanagawa (JP)

(72) Inventors: Nobuyasu Kanekawa, Tokyo (JP); Hitoshi Arimitsu, Kanagawa (JP); Takashi Yasumasu, Kanagawa (JP); Hideki Matsuyama, Kanagawa (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 70 days.

(21) Appl. No.: 14/705,127

(22) Filed: May 6, 2015

(65) Prior Publication Data

US 2015/0339201 A1     Nov. 26, 2015

(30) Foreign Application Priority Data

May 22, 2014   (JP) .................................. 2014-105926

(51) Int. Cl.
*G06F 11/16*     (2006.01)
*G06F 11/20*     (2006.01)
*G06F 11/18*     (2006.01)

(52) U.S. Cl.
CPC ........ *G06F 11/2053* (2013.01); *G06F 11/165* (2013.01); *G06F 11/1616* (2013.01);
(Continued)

(58) Field of Classification Search
CPC ............. G06F 11/1629; G06F 11/1654; G06F 11/1641; G06F 11/165
See application file for complete search history.

(56) References Cited

U.S. PATENT DOCUMENTS

| | | | | | |
|---|---|---|---|---|---|
| 4,165,533 | A | * | 8/1979 | Jonsson | G11C 29/02 714/53 |
| 4,794,601 | A | * | 12/1988 | Kikuchi | G06F 11/10 714/758 |

(Continued)

FOREIGN PATENT DOCUMENTS

JP       2012-177964 A       9/2012

OTHER PUBLICATIONS

Everything You Always Wanted to Know About SDRAM (Memory): But Were Afraid to Ask by Rajinder Gill Aug. 15, 2010 http://www.anandtech.com/show/3851/everything-you-always-wanted-to-know-about-sdram-memory-but-were-afraid-to-ask.*

(Continued)

*Primary Examiner* — Joseph Schell
(74) *Attorney, Agent, or Firm* — Sughrue Mion, PLLC

(57) ABSTRACT

The present invention provides a microcontroller which can continue operation even at the time of a failure without making a memory redundant to suppress increase in chip area. The microcontroller includes three or more processors executing the same process in parallel and a storage device. The storage device includes a memory mat having a storage region which is not redundant, an address selection part, a data output part, and a failure recovery part. The address selection part selects a storage region in the memory mat on the basis of three or more addresses issued at the time of an access by the processors. The data output part reads data from the storage region in the memory mat selected by the address selection part. The failure recovery part corrects or masks a failure of predetermined number or less which occurs in the memory mat, the address selection part, and the data output part.

20 Claims, 17 Drawing Sheets

(52) U.S. Cl.
CPC ........ G06F 11/1641 (2013.01); G06F 11/183 (2013.01); G06F 11/187 (2013.01); *G06F 2201/85* (2013.01)

(56) References Cited

U.S. PATENT DOCUMENTS

| | | | | |
|---|---|---|---|---|
| 5,226,043 | A * | 7/1993 | Pughe, Jr. ............ | G06F 11/1016 714/768 |
| 5,379,415 | A * | 1/1995 | Papenberg ............ | G06F 11/106 714/5.11 |
| 5,812,757 | A * | 9/1998 | Okamoto ............ | G06F 11/1658 714/11 |
| 6,460,091 | B1 * | 10/2002 | Ishimoto ................ | G11C 29/18 710/1 |
| 2002/0152420 | A1 * | 10/2002 | Chaudhry ........... | G06F 11/1641 714/11 |
| 2004/0088635 | A1 * | 5/2004 | Kravtchenko ..... | G11B 20/1833 714/758 |
| 2005/0278567 | A1 * | 12/2005 | Wolfe .................... | G06F 11/187 714/11 |
| 2012/0221923 | A1 * | 8/2012 | Uchibori ............... | H03M 13/05 714/763 |

OTHER PUBLICATIONS

Communication dated Nov. 9, 2015 from the European Patent Office in counterpart application No. 15167102.1.

* cited by examiner

| Case | PROCESSOR 101-1 | PROCESSOR 101-2 | PROCESSOR 101-3 | PROCESSOR 101-4 | FAILURE PART | SELECTION |
|---|---|---|---|---|---|---|
| 1 | = | | * | | | a |
| 2 | ≠ | | = | | 101-1,2 | b |
| 3 | ≠ | | ≠ | | 101-1~4 | – |

FIG. 5

| Case | PROCESSOR 101-1 | PROCESSOR 101-2 | PROCESSOR 101-3 | FAILURE PART | SELECTION |
|---|---|---|---|---|---|
| 1 | = | | * | | a |
| 2 | ≠ | | = | 101-1 | b |
| 3 | ≠ | | ≠ | 101-1~3 | - |

FIG. 6

| Case | PROCESSOR 101-1 | PROCESSOR 101-2 | PROCESSOR 101-3 | PROCESSOR 101-1 | FAILURE PART | SELECTION |
|---|---|---|---|---|---|---|
| 1 | = | = | = | | | a |
| 2 | ≠ | = | = | | | b |
| 3 | = | ≠ | = | | | a |
| 4 | ≠ | ≠ | = | | 101-2 | a |
| 5 | = | = | ≠ | | | a |
| 6 | ≠ | = | ≠ | | 101-1 | b |
| 7 | = | ≠ | ≠ | | 101-3 | a |
| 8 | ≠ | ≠ | ≠ | | 101-1~3 | - |

FIG. 17

BLOCK ERROR CORRECTION CODE (FOR 32-BIT WIDTH MEMORY)

| CONFIGURATION PARAMETERS | | | OVERHEAD | | |
|---|---|---|---|---|---|
| | | | DECODER | REDUNDANT BITS | |
| b | n | k | | 1S ERROR CORRECTION | 2S ERROR DETECTION |
| 2 | 6 | 2 | 48 | 64 | 96 |
| 3 | 21 | 15 | 17 | 18 | 27 |
| 4 | 60 | 52 | 10 | 8 | 12 |
| 5 | 155 | 145 | 9 | 10 | 15 |
| 6 | 378 | 366 | 8 | 12 | 18 |
| 7 | 889 | 875 | 7 | 14 | 21 |
| 8 | 2040 | 2024 | 6 | 16 | 24 |
| 9 | 4599 | 4581 | 6 | 18 | 27 |
| 10 | 10230 | 10210 | 6 | 20 | 30 |
| 11 | 22517 | 22495 | 5 | 22 | 33 |

FIG. 18

BLOCK ERROR CORRECTION CODE (FOR 64-BIT WIDTH MEMORY)

| CONFIGURATION PARAMETERS | | | OVERHEAD | | |
|---|---|---|---|---|---|
| | | | DECODER | REDUNDANT BITS | |
| b | n | k | | 1S ERROR CORRECTION | 2S ERROR DETECTION |
| 2 | 6 | 2 | 96 | 128 | 192 |
| 3 | 21 | 15 | 32 | 30 | 45 |
| 4 | 60 | 52 | 20 | 16 | 24 |
| 5 | 155 | 145 | 15 | 10 | 15 |
| 6 | 378 | 366 | 13 | 12 | 18 |
| 7 | 889 | 875 | 12 | 14 | 21 |
| 8 | 2040 | 2024 | 10 | 16 | 24 |
| 9 | 4599 | 4581 | 10 | 18 | 27 |
| 10 | 10230 | 10210 | 9 | 20 | 30 |
| 11 | 22517 | 22495 | 8 | 22 | 33 |

BLOCK ERROR CORRECTION CODE (FOR 128-BIT WIDTH MEMORY)

| CONFIGURATION PARAMETERS | | | OVERHEAD | | |
|---|---|---|---|---|---|
| | | | DECODER | REDUNDANT BITS | |
| b | n | k | | 1S ERROR CORRECTION | 2S ERROR DETECTION |
| 2 | 6 | 2 | 192 | 256 | 384 |
| 3 | 21 | 15 | 61 | 54 | 81 |
| 4 | 60 | 52 | 38 | 24 | 36 |
| 5 | 155 | 145 | 28 | 10 | 15 |
| 6 | 378 | 366 | 24 | 12 | 18 |
| 7 | 889 | 875 | 21 | 14 | 21 |
| 8 | 2040 | 2024 | 18 | 16 | 24 |
| 9 | 4599 | 4581 | 17 | 18 | 27 |
| 10 | 10230 | 10210 | 15 | 20 | 30 |
| 11 | 22517 | 22495 | 14 | 22 | 33 |

MICROCONTROLLER UTILIZING REDUNDANT ADDRESS DECODERS AND ELECTRONIC CONTROL DEVICE USING THE SAME

CROSS-REFERENCE TO RELATED APPLICATIONS

The disclosure of Japanese Patent Application No. 2014-105926 filed on May 22, 2014 including the specification, drawings and abstract is incorporated herein by reference in its entirety.

BACKGROUND

The present invention relates to a microcontroller and an electronic control device using the same and, more particularly, to a technique which can be suitably used for a reliable electronic control device capable of continuing operation even when a failure occurs.

Automation of control is advancing and demand for safety and reliability of an electronic control device is increasing. To assure safety, an electronic control device is demanded to immediately detect abnormality at the time of occurrence of the abnormality and stop the operation. With respect to a processor processing information, to immediately detect abnormality at the time of occurrence of the abnormality and stop the operation, a method of providing two processors and comparing outputs of the two processors has been used from a long time ago. In recent years, as semiconductor processes are becoming finer, a plurality of processors can be mounted on one chip, and a safety microcontroller having in-chip redundancy that a memory necessary for the operation of the dual processors is added to the one chip is practically used mainly for vehicle control.

In recent years, it is demanded not only to immediately detect abnormality at the time of occurrence of the abnormality and stop the operation but also to continue the operation even at the time of a failure.

As the technical trend in recent years, the semiconductor processes are becoming finer and more processors can be mounted on one chip. Processors of the number necessary to continue operation even at the time of a failure can be mounted on one chip. To continue operation even at the time of a failure by simply applying the above-described technique, two sets of safety microcontrollers each configured by dual processors and a memory are mounted on one chip.

On the other hand, as a countermeasure against a failure in a memory, an error correction code (ECC) is applied. For example, an SECDED (Single Error Correction Double Error Correction) code is used. The code, as the name indicates, is suitable to a system in which when an error of one bit occurs, the error is corrected and the operation can be continued and, when an error of two bits occurs, the operation is stopped for the first time.

Patent literature 1 discloses a memory system realizing a sophisticated error correction only by a single general memory module. The system has "m" pieces of semiconductor memory chips having n-bit input and output. An error correction code of n bits×(m−l) is added to data of n bits×l, and n bits are stored in each of the m pieces of semiconductor memories (l, m, and n are natural numbers). As error correction capability, an error which occurs in one place in n-bit unit can be corrected and errors which occur in two places can be detected.

RELATED ART LITERATURE

Patent Literature

Patent literature 1: Japanese Unexamined Patent Application Publication No. 2012-177964

SUMMARY

In simple extension of the above-described related art, a further consideration on the advantages of formation in one chip is necessary. Specifically, in the case of simply mounting two sets of conventional safety microcontrollers, from the viewpoint of isolation of a failure, a configuration of mounting the microcontrollers in different chips is more excellent. To realize equivalent or better isolation of a failure at the time of mounting microcontrollers in one chip, an overhead with respect to the area such as device of layout and an overhead of development cost to realize it accompany. That is, there is a challenge in an advantage of mounting redundant resources for enabling operations continued also at the time of a failure on one chip, particularly, cost reduction, that is, chip area reduction.

However, the ratio of use by a processor in the chip area tends to increase for the following reasons. The process of making semiconductor processes finer is gentle as compared with a logic circuit and, moreover, the memory capacity used by the processors tends to increase. Therefore, it is not allowed from the viewpoint of chip area, that is, cost to similarly make the memory redundant at the time of mounting a number of processors on one chip.

To enable the operation continue even at the time of a failure, a plurality of redundant processors and an error-correctable memory are mounted on one chip. For the memory, for example, an SECDED and an error correction described in the patent literature 1 are applied.

However, in a normal SECDED, an error which occurs in data can be corrected but, for example, a failure which occurs in an address system such as an address decoder cannot be corrected, so that the address system has a single point of a failure. The single point of a failure refers to a failure part which may spread to erroneous operation of the whole system due to a failure in one place. The single point of a failure becomes a disturbance to continue operation at the time of a failure. The inventors of the present invention have examined application of an error correction (S8ECD8ED) described in the patent literature 1 in place of normal SECDED. As a result, it was found that there is the following new problem. That is, a memory control unit becomes a single point of a failure. An address bus is a wire in a DIMM and is also a single point of a failure.

Means for solving such a problem will be described hereinbelow and the other problems and novel features will become apparent from the description of the specification and the appended drawings.

An embodiment will be described below.

A microcontroller according to an embodiment includes three or more processors executing the same process in parallel and a storage device. The storage device includes a memory mat having a storage region which is not redundant, an address selection part, a data output part, and a failure recovery part. The address selection part selects a storage region in the memory mat on the basis of three or more addresses issued at the time of an access by the processors. The data output part reads data from the storage region in the memory mat selected by the address selection part. The failure recovery part corrects or masks a failure of predetermined number or less which occurs in the memory mat, the address selection part, and the data output part.

An effect obtained by the embodiment will be briefly described as follows.

The present invention can provide a microcontroller capable of continuing operation even at the time of a failure without making a memory redundant to suppress increase in chip area.

BRIEF DESCRIPTION OF THE DRAWINGS

FIG. 5 is an explanatory diagram illustrating an example of a selecting method of the selector 202 in the embodiment of FIG. 4.

FIG. 6 is an explanatory diagram illustrating another example of the selecting method of the selector 202 in the embodiment of FIG. 4.

FIG. 17 is an explanatory diagram illustrating the relation between configuration parameters and overhead of a Reed-Solomon code in a memory 200 having 32-bit width.

FIG. 18 is an explanatory diagram illustrating the relation between configuration parameters and overhead of a Reed-Solomon code in a memory 200 having 64-bit width.

DETAILED DESCRIPTION

1. Outline of Embodiments

Figure 1:
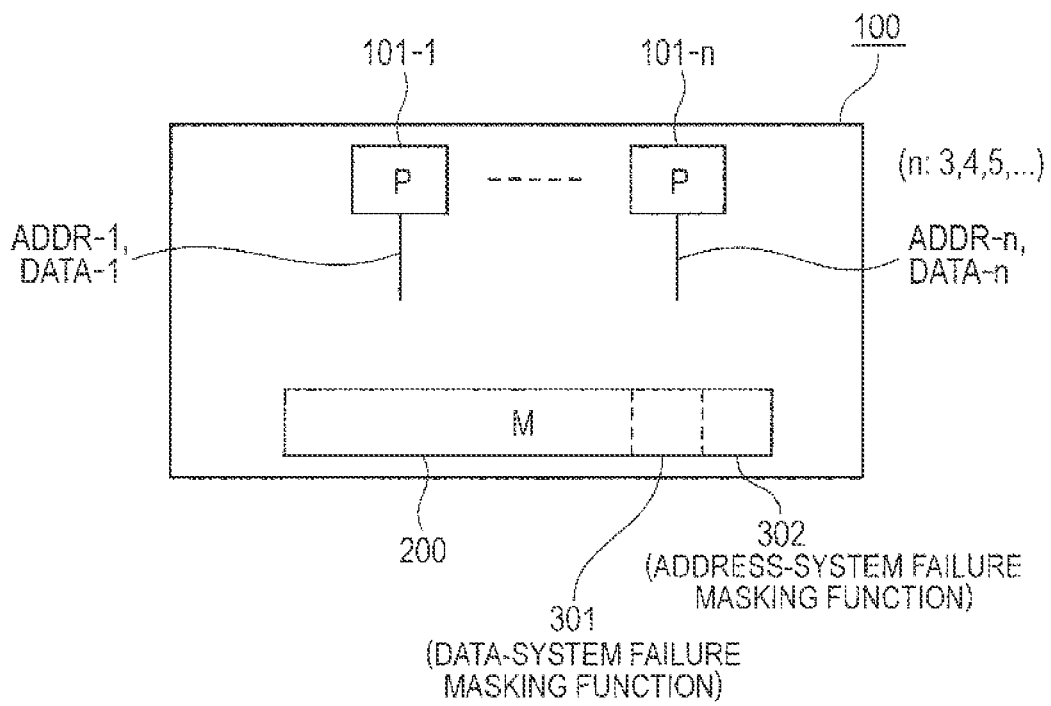
FIG. 1 is a block diagram illustrating a configuration example of a microcontroller according to a representative embodiment of the present application.

First, outline of representative embodiments disclosed in the present application will be described. Reference numerals in the drawings referred to with parenthesis in the description of outline of the representative embodiments merely indicate parts included in the concept of components to which the reference numerals are designated.

[1] Reliable Microcomputer Having Address-System Failure Mask

A representative embodiment disclosed in the present application relates to a microcontroller (100) having three or more processors (101-1 to 101-n) and a storage device (200) and configured as follows.

The three or more processors can execute the same process in parallel.

The storage device has a memory mat (203), an address selection part (301), a data output part (301), and failure recovery units (301, 302). The memory mat has a storage region which corresponds to an address issued at the time of an access by the processor and is not redundant. The address selection part selects a storage region in the memory mat on the basis of three or more addresses issued at the time of an access by the three or more processors. The data output unit reads data from the storage region in the memory mat selected by the address selection part. The failure recovery units correct or mask a failure of a predetermined number or less which occurs in the memory mat, the address selection part, and the data output unit.

With the configuration, the present invention can provide the microcontroller capable of continuing operation also at the time of a failure without making the memory mat redundant, therefore, while suppressing increase in the chip area. Since the microcontroller has three or more processors which execute the same process in parallel, even when a failure occurs in the processors, if the number of failure points is equal to or less than predetermined number, the failure is masked by majority vote or the like, and the operation can be continued. Even when a failure occurs in the entire storage device including the memory mat which is not made redundant, if the number of failure points is equal to or less than predetermined number, the failure is corrected or masked by the failure recovery unit, so that the microcontroller can continue its operation.

[2] Redundancy of Address Decoder

In the term 1, the memory mat is configured by a storage region of L words each made of W bits (W and L are natural numbers). The address selection part has i pieces of address decoders (201-1 to 201-i) (i is a natural number) outputting a selection signal selecting one word from the L words on the basis of addresses which are input, and majority logic circuits (206-1 to 206-L) to which the selection signals supplied from the i pieces of address decoders are input and which select one word from the L words of the memory mat.

With the configuration, the present invention can provide a microcontroller, even when a failure occurs in an address selection part as an address system of a memory, capable of continuing operation by masking the failure (having an address-system failure masking function).

[3] Data-System Failure Masking Function (SECDED)

In the term 2, the failure recovery part (210, 210*a*, 210*b*) performs 1-bit error correction 2-bit error detection on data read from the memory mat.

With the configuration, the present invention can provide a microcontroller having a data-system failure masking function by an SECDED and, even when a failure occurs in the data system, capable of continuing operation by masking the failure.

[4] Three Processors

In the term 2 or 3, the microcontroller has first, second, and third processors (101-1, 101-2, and 101-3) as the three or more processors, and the first, second, and third processors issue first, second, and third addresses, respectively, to access the storage device.

The microcontroller includes a first comparator (102-1) comparing the first and second addresses, and a second comparator (102-2) comparing the second and third addresses. The microcontroller further includes i pieces of selectors (202-1 to 202-*i*) to which the first and third addresses are supplied and which supplies, on the basis of a comparison result of the first and second comparators, any one of the first and third addresses to a corresponding address decoder (201-1 to 201-*i*).

The selector supplies the first address to a corresponding address decoder when a comparison result of the first comparator indicates that the first and second addresses are equal to each other. The selector supplies the third address to a corresponding address decoder when a comparison result of the first comparator indicates that the first and second addresses are not equal to each other and a comparison result of the second comparator indicates that the second and third addresses are equal to each other (FIGS. 5 and 6).

As described above, the three redundant processors are provided and, when a failure causing an error in one address occurs in three addresses issued by the three processors, can mask the failure and continue operation. Further, by making also the selectors selecting a normal address from three addresses redundant, a single point of a failure is prevented.

[5] Four Processors

In the term 2 or 3, the microcontroller has first, second, third, and fourth processors (101-1 to 101-4) as the three or more processors, the first, second, third, and fourth processors issue first, second, third, and fourth addresses, respectively, to access the storage device.

The microcontroller includes a first comparator (102-1) comparing the first and second addresses and a second comparator (102-2) comparing the third address and the fourth address. The microcontroller also has i pieces of selectors (202-1 to 202-*n*) to which the first and third addresses are supplied and which supplies, on the basis of a comparison result of the first and second comparators, any one of the first and third addresses to a corresponding address decoder (201-1 to 201-*i*).

Figures 3, 4:
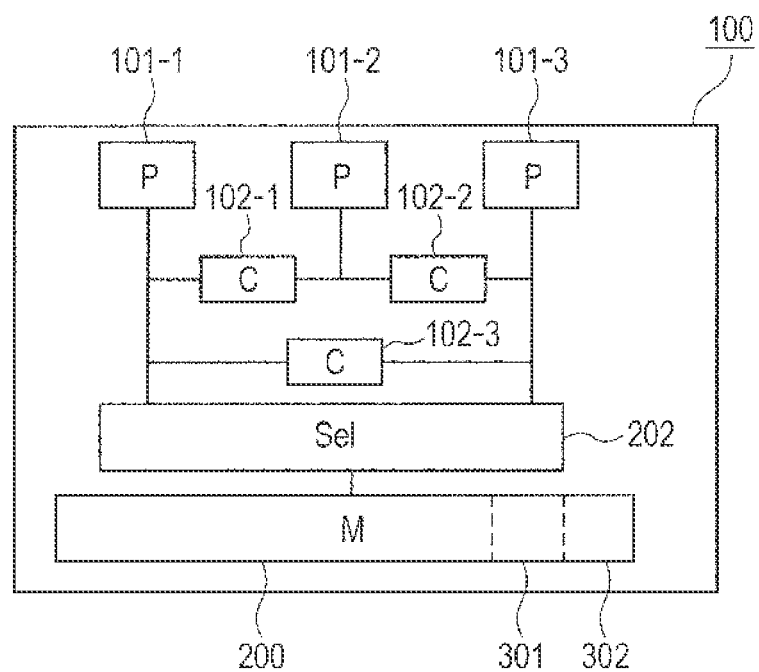
FIG. 3 is an explanatory diagram illustrating a selecting method of a selector 202 in the embodiment of FIG. 2.
FIG. 4 is a block diagram illustrating a configuration example of a microcontroller by three redundant processors.

The selector supplies the first address to a corresponding address decoder when a comparison result of the first comparator indicates that the first and second addresses are equal to each other. The selector supplies the third address to a corresponding address decoder when a comparison result of the first comparator indicates that the first and second addresses are not equal to each other and a comparison result of the second comparator indicates that the third and fourth addresses are equal to each other (FIG. 3).

As described above, the four redundant processors are provided and, when a failure causing an error in one address occurs in four addresses issued by the four processors, can mask the failure and continue operation. Further, by making also the selectors selecting a normal address from four addresses redundant, a single point of a failure is prevented.

[6] Row Decoder and Column Decoder

In the term 2, each of the i pieces of address decoders has a row decoder (201*r*-1 to 201*r*-*i*) and a column decoder (201*c*-1 to 201*c*-*i*).

With the configuration, the circuit scale of the address decoders can be suppressed to be small.

[7] Division in Block Unit of Reed-Solomon Code of Memory Mat

In the term 1, the failure recovery part can execute an error correction on a code word of "c" symbols of a Reed-Solomon code using "b" bits as one symbol, on data read from the memory mat (b and c are natural numbers). The memory mat is configured by a storage region of L words each made of W bits (W and L are natural numbers) and divided into a plurality of partial memory mats (203-1 to 203-*c*) of L words each made of "b" bits or less. The address selection part has address decoders (201-1 to 201-*c*) each outputting a selection signal selecting one word from the L words on the basis of an address supplied, so that the address decoders are associated with the plurality of partial memory mats.

With the configuration, the present invention can provide the microcontroller, even when a failure occurs in the address selection part as the address system of the memory, capable of masking the failure and continuing operation (having the address-system failure masking function).

[8] Read Data Less than One Symbol

In the term 7, the failure recovery part executes the error correction by compensating one bit or plural bits whose value is preliminarily specified to data read from the partial memory mat in which the number of bits per word is less than the "b" bits in the plurality of partial memory mats. When the number of the plurality of partial memory mats is less than "c", the failure recovery part executes the error correction by compensating data whose value is preliminarily specified of a number equal to insufficient symbols to data read from the plurality of partial memory mats.

With the configuration, the present invention can provide the microcontroller having the address-system failure masking function and the data-system failure masking function also in the case where there is unconformity between block division of the memory mat and the code word of an error correction code.

[9] 32-Bit-Width Memory

Figures 19, 20:
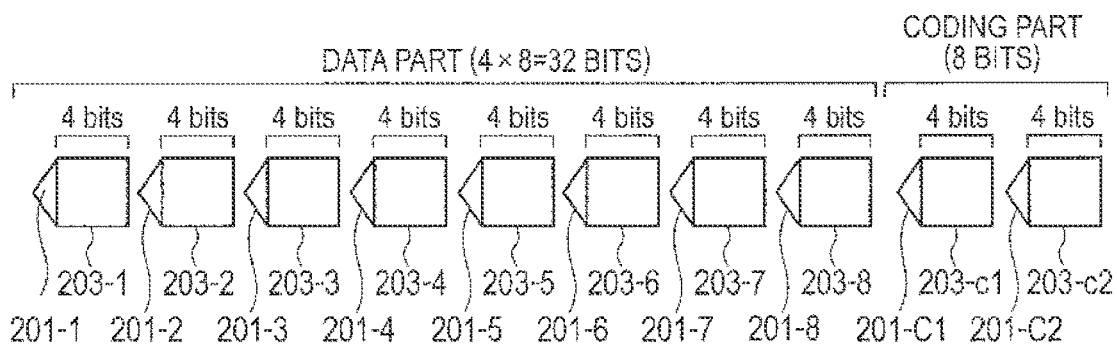
FIG. 19 is an explanatory diagram illustrating the relation between configuration parameters and overhead of a Reed-Solomon code in a memory 200 having 128-bit width.
FIG. 20 illustrates a configuration example of a memory 200 having 32-bit width which is block-divided.

In the term 7, the failure recovery part can execute an error correction on a code word of 10 symbols of a Reed-Solomon code using four bits as one symbol, on data read from the memory mat. The memory mat is comprised of a storage region of L words each made of 32 bits and divided into 10 pieces of partial memory mats (203-1 to 203-8, 203-C1, and 203-C2) of L words each made of four bits. The address selection part has address decoders (201-1 to 201-8, 201-C1, and 201-C2) each outputting a selection signal selecting one word from the L words on the basis of an address supplied, so that the address decoders are associated with the 10 pieces of partial memory mats (FIGS. 17 and 20).

With the configuration, the present invention can provide the microcontroller in which a memory of 32-bit width has the address-system failure masking function and the data-system failure masking function.

[10] 64-Bit-Width Memory

Figure 21:
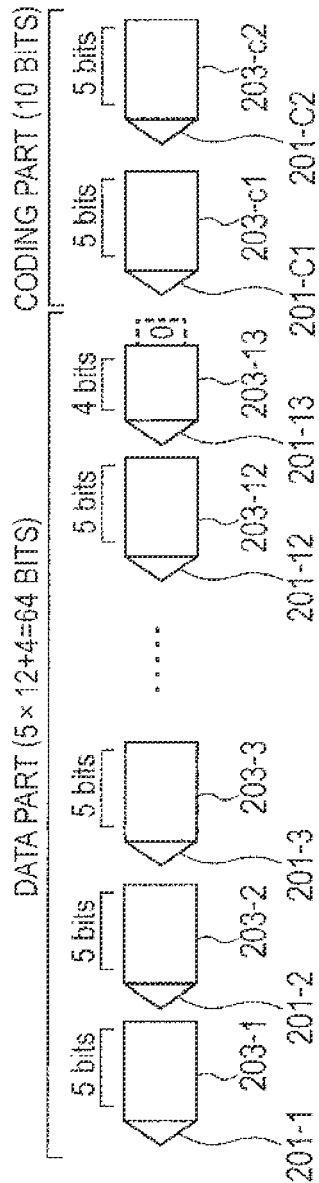
FIG. 21 illustrates a configuration example of a memory 200 having 64-bit width which is block-divided.

In the term 7, the failure recovery part can execute an error correction on a code word of 15 symbols of a Reed-Solomon code using five bits as one symbol, on data read from the memory mat. The memory mat is comprised of a storage region of L words each made of 64 bits and divided into 14 pieces of partial memory mats (203-1 to 203-12, 203-C1, and 203-C2) of L words each made of five bits and one partial memory mat (203-13) of L words each made of four bits. The address selection part has address decoders (201-1 to 201-13, 203-C1, and 203-C2) each outputting a selection signal selecting one word from the L words on the basis of an address supplied, so that the address decoders are associated with the 15 pieces of partial memory mats (FIGS. 18 and 21).

With the configuration, the present invention can provide the microcontroller in which a memory of 64-bit width has the address-system failure masking function and the data-system failure masking function.

[11] Partially-Writable 64-Bit-Width Memory

Figure 22:
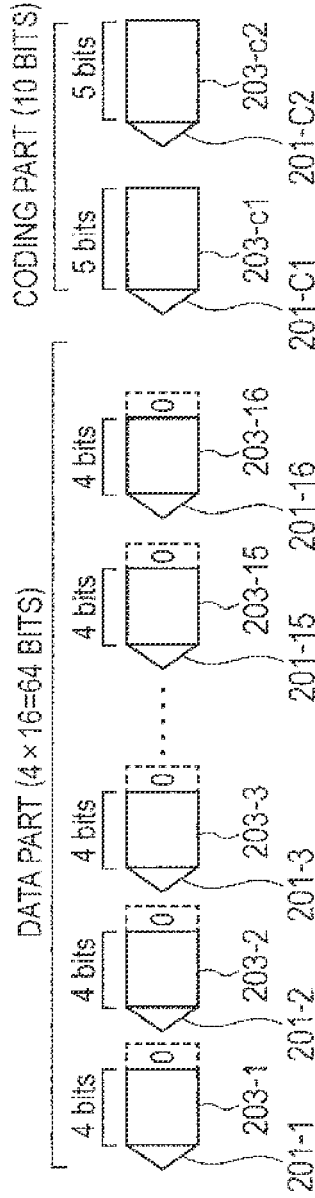
FIG. 22 illustrates a configuration example of a memory 200 having 64-bit width which is block-divided and enables partial write.

In the term 7, the failure recovery part can execute an error correction on a code word of 18 symbols of a Reed-Solomon code using five bits as one symbol, on data read from the memory mat. The memory mat is comprised of a storage region of L words each made of 64 bits and divided into 18 pieces of partial memory mats (203-1 to 203-16, 203-C1, and 203-C2) of L words each made of four bits. The address selection part has address decoders (201-1 to 201-16, 203-C1, and 203-C2) each outputting a selection signal selecting one word from the L words on the basis of an address supplied, so that the address decoders are associated with the 18 pieces of partial memory mats (FIG. 22).

With the configuration, the present invention can provide the microcontroller in which a partially-writable memory of 64-bit width has the address-system failure masking function and the data-system failure masking function.

[12] Single Chip

The microcontroller (100) in any of the terms 1 to 11, wherein the three or more processors and the storage device are configured on a single semiconductor substrate.

With the configuration, the present invention can provide a highly-integrated, highly-reliable microcontroller LSI.

[13] Electronic Control Device (High-Reliable System)

An electronic control device on which the microcontroller (100) described in any of the terms 1 to 12 is mounted.

With the configuration, the present invention can provide an electronic control device (high-reliable system) whose reliability is achieved by the high-reliable microcontroller.

[14] High-Reliable Microcontroller having Address-System Failure Mask

A representative embodiment disclosed in the present application relates to a microcontroller (100) having, in the same chip, three or more processors (101-1 to 101-n) and a memory (200) having a data-system failure masking function (301) and an address-system failure masking function (302). The data-system failure masking function is a function, when a failure of a predetermined number or less occurs in a wire or a circuit on a path of writing data from the processor to the memory or in a wire or a circuit on a path of reading data from the memory to the processor, of masking the influence of the failure so that the influence does not extend to entire operations of the microcontroller. The address-system failure masking function is a function, when a failure of a predetermined number or less occurs in a wire or a circuit on a path of an address which is output when the processor accesses the memory, of masking the influence of the failure so that the influence does not extend to entire operations of the microcontroller.

With the configuration, the present invention can provide the microcontroller capable of continuing operation also at the time of a failure without making the memory mat redundant, therefore, while suppressing increase in the chip area. Since the microcontroller has three or more processors, the same process can be executed in parallel. Even when a failure occurs in the processors, if the number of failure points is equal to or less than predetermined number, the failure is masked by majority vote or the like, and the operation can be continued. Even when a failure occurs in any of paths accessing memories including a memory mat which is not made redundant, if the number of failure points is equal to or less than predetermined number, the failure is masked so that the influence of the failure is not exerted on the whole, so that the microcontroller can continue its operation.

[15] SECDED

In the term 14, the data-system failure masking function is a 1-bit error correction 2-bit error detection code.

With the configuration, even an error of one bit occurs in the data system between processor memories, by correcting the error, the failure is masked and the operation can be continued. On the other hand, an error of two bits is detected, the operation of the microcontroller is stopped, or the operation can be shifted to failure analysis, restoration, and recovery operation.

[16] Redundant Address Decoder+Majority Circuit

In the term 14, for the address-system failure masking function, the memory has address decoders (201-1 to 201-i) which are made redundant and a memory cell (203) selected by a result of majority vote of outputs of the redundant address decoders.

With the configuration, the present invention can provide a microcontroller, even when a failure occurs in the address selection part as the address system of the memory, capable of masking the failure and continuing operation (having the address-system failure masking function).

[17] Block Division by Bit Slicing

In the term 14, for the address-system failure masking function, the memory has a memory cell (203-1 to 203-c) divided into blocks by bit slicing, address decoders (201-1 to 201-c) corresponding to the blocks, respectively, and an error correction circuit (210, 210a, 210b) using a code for detecting an error in a block unit.

With the configuration, the present invention can provide a microcontroller, even when a failure occurs in the address system of the memory, capable of correcting/masking the failure by the data-system failure masking function and continuing operation (having the address-system failure masking function).

[18] Reed-Solomon Code

In the term 17, a code for detecting an error in the block unit is a Reed-Solomon code.

Consequently, an error correction in block unit can be mounted by a known error correction circuit using a Reed-Solomon code.

[19] Error Correction Circuit for Each Processor

Figure 10:
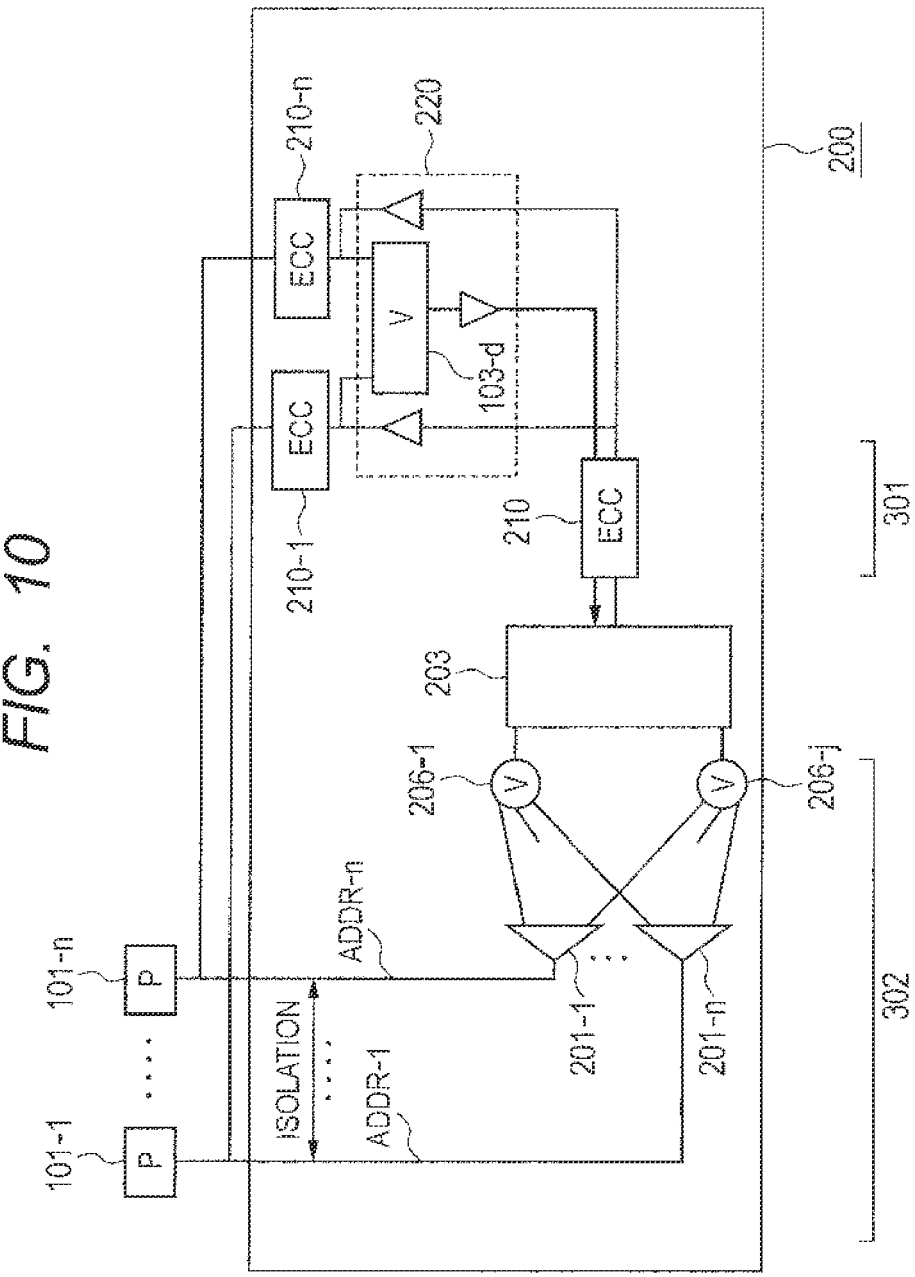
FIG. 10 is a block diagram illustrating a configuration example of the memory 200 that a majority vote is taken among redundant address decoders suitable to the embodiment of FIG. 7.

In the term 17, the error correction circuit (210-1 to 210-n) is provided for each of the processors (FIG. 10).

Consequently, the error correction circuit is made redundant and a single point of a failure is prevented.

[20] Electronic Control Device (High-Reliable System)

An electronic control device on which the microcontroller described in any of the terms 14 to 19 is mounted.

With the configuration, the present invention can provide an electronic control device (high-reliable system) whose reliability is achieved by the high-reliable microcontroller.

2. Details of Embodiments

The embodiments will be described more specifically.

First Embodiment

FIG. 1 illustrates a representative embodiment disclosed in the present application. A microcontroller 100 includes redundant processors 101-1 to 101-n and a memory 200 having a data-system failure masking function 301 and an address-system masking function 302. Although not limited, the microcontroller 100 is formed, for example, on a single semiconductor substrate of silicon or the like by using the known CMOS (Complementary Metal-Oxide-Semiconductor field effect transistor) LSI (Large Scale Integrated circuit) technique. The microcontroller 100 may be configured, for example, so as to be separated as a logic circuit chip made by a plurality of processors and the like and a memory chip and may be mounted so as to be stacked or the like by the known technique such as SIP (System In Package) or MCM (Multi-Chip Module), The redundant processors 101-1 to 101-n execute the same process in parallel. More specifically, the redundant processors 101-1 to 101-n read the same instruction from the same address and execute it at the same time, read the same data at the same time, and output the same result at the same time. The results are reflected in a general register and a status register or written in the memory. "The same time" basically refers to the same clock cycle but may include a time difference of, for example, a few cycles within a range where the sameness of processes executed by the redundant processors is assured.

The memory 200 has the data-system failure masking function 301 and the address-system failure masking function 302. More concretely, the memory 200 includes a non-redundant memory mat having a single storage region corresponding to an address designated at the time of an access from each processor, an address selecting unit selecting a storage region in the memory mat, a data output unit reading data from the storage region selected by the address selecting unit, and a failure recovery unit. The address selecting unit selects a storage region in a memory mat on the basis of addresses ADDR-1 to ADDR-n output from the processors 101-1 to 101-n.

The data output unit reads data from the selected storage region, and the failure recovery unit performs error correction and error detection on the read data. An error correction code is added to data stored in the memory mat. The failure recovery unit corrects errors in the range of the error correction capability by the error correction code and detects an error in the range of the error correction capability. For example, in the case where the SECDED is employed for an error correction code, a 1-bit error is corrected, a 2-bit error is detected, and an error of larger bits cannot be detected. By the error correction/error detection operation of the failure recovery unit, the data-system failure masking function 301 in the memory 200 is realized.

The failure recovering unit further realizes the address-system failure masking function 302 in the memory 200. To the address selecting unit, the addresses ADDR-1 to ADDR-n output from the processors 101-1 to 101-n are supplied. When all of the processors 101-1 to 101-n normally operate, the addresses ADDR-1 to ADDR-n are the same. However, when a failure occurs in any of the processors, the value of one address out of the addresses ADDR-1 to ADDR-n becomes different from those of the other addresses. At this time, the address selecting unit ignores the address which became different due to the failure from the other addresses by a majority circuit or the like, and selects the storage region in the memory mat by a correct address. However, when a failure occurs in the address selecting unit itself, a storage region which is not correct is selected. In this case, the failure cannot be corrected or detected by the data-system failure masking function 301. The failure recovering unit is configured so as to be able to recover a failure occurring in the address selecting unit. For example, the address selecting unit is comprised of a plurality of redundant address decoders and a majority circuit for a plurality of decode results to mask a failure occurring in an address decoder. In another example, an error correction of data stored in the memory mat is performed by a block code having error correction capability in unit of a plurality of bits, the memory mat is divided by plural bits corresponding to a unit of correction, and an address decoder is provided for each of the divided parts of the memory mat. Even when a failure occurs in address decoders of a number which is in the range of the correction capability by the error correction code in a plurality of address decoders, an error occurring in data read by the failure is corrected by the above-described data-system failure masking function 301. As a result, a failure occurring in the address decoder is masked. As a block code having capability of performing error correction and error detection in the unit of a plurality of bits, a Reed-Solomon code is known. As the present invention provides, the paths of the addresses ADDR-1 to ADDR-n starting from the processors 101-1 to 101-n to the address decoders and the error correction circuit in the data unit are made redundant and, after that, a block error correction code (for example, S8ECD8ED) described in the patent literature 1 can be applied.

In such a manner, without making the memory mat redundant, therefore, while suppressing increase in the chip area, a microcontroller which can continue operation even at the time of a failure can be provided. Since the microcontroller has three or more processors which execute the same process in parallel, even when a failure occurs in a processor, if the number of failure parts is equal to or less than a predetermined number, by masking the failure by majority vote or the like, the operation can be continued. Even when a failure occurs in any part in the entire storage device including the non-redundant memory mat, if the number of failure parts is equal to or less than a predetermined number, the failure parts are corrected or masked by the failure recovering unit, so that the microcontroller can continue its operation.

The memory 200 may be a RAM (Random Access Memory) or a ROM (Read Only Memory). In the case of a RAM, a coding circuit of generating a redundant part (coding part) for error correction and adding it is provided on a path for writing data, and the failure recovering unit performs an error correction/error detection process corresponding to the circuit. In the case of a ROM, the coding circuit is not provided, and data to which the redundant part (coding part) for error correction is added in advance is written. "Data" refers to a value stored in the memory and, for a processor, may be data in a narrow sense, an instruction code, or any other value. The memory 200 may be, although not limited, coupled to the processors 101-1 to 101-n via a bus, and other bus masters and other memories may be coupled to the bus. In addition to the memory 200, a memory having the data-system failure masking function 301 and the address-system failure masking function 302 like the memory 200 may be further provided.

Figure 2:
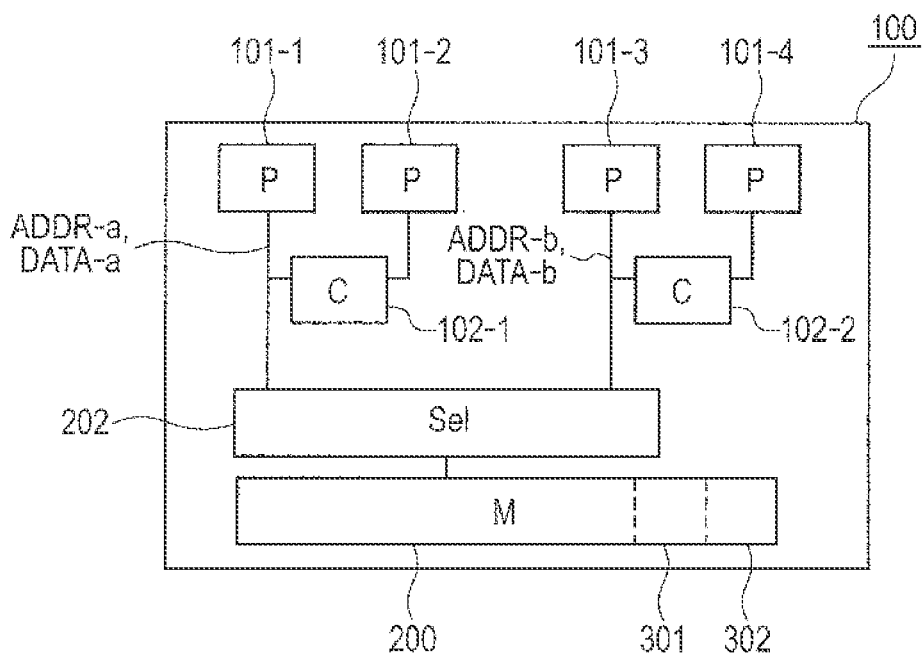
FIG. 2 is a block diagram illustrating a configuration example of a microcontroller by four redundant processors.
Figure 7:
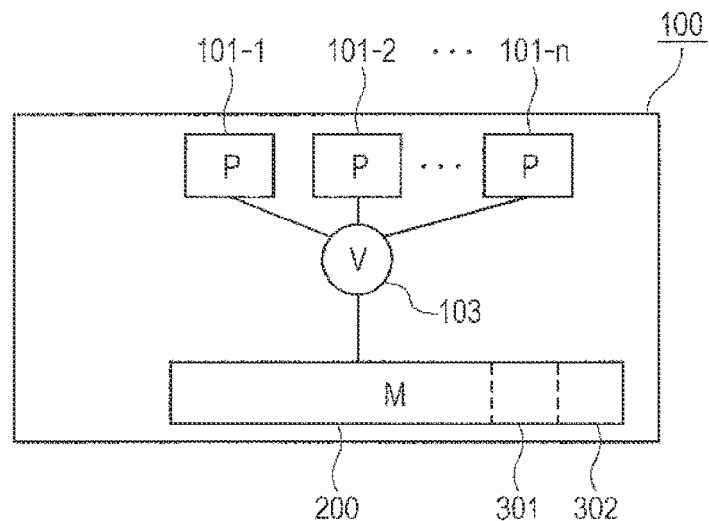
FIG. 7 is a block diagram illustrating a configuration example of a microcontroller in which a majority vote is taken among "n" pieces of redundant processors.

To detect a failure in a processor itself, mask it, and continue the operation, three or more redundant processors 101-1 to 101-n are necessary. FIG. 2 illustrates an embodiment that four redundant processors are provided. FIGS. 4 and 7 illustrate embodiments that three redundant processors are provided.

A microcontroller 100 illustrated in the embodiment of FIG. 2 has comparators 102-1 and 102-2 and a selector 202 between the four redundant processors 101-1 to 101-4 and the memory 200. Address outputs of the processors 101-1 and 101-3 are input as ADDR-a and ADDR-b to the selector 202, and data outputs of the processors 101-1 and 101-3 are input as DATA-a and DATA-b to the selector 202. Although a bus is not illustrated in signal lines depicted in FIG. 2 and other drawings of the present application, the addresses and data are supplied via a bus made of a plurality of bits. The comparator 102-1 compares outputs of the redundant processors 101-1 and 101-2, the comparator 102-2 compares outputs of the processors 101-3 and 101-4, and the comparison results are output to the selector 202 via not-illustrated signal lines or the like. Comparison of outputs from a plurality of processors includes not only comparison of addresses and data but also comparison of states of control lines (for example, a read/write signal, an enable signal, and the like for the memory) and comparison of values of registers or the like in the processors. The selector 202 outputs the address ADDR-a or ADDR-b selected by the selecting method illustrated in FIG. 3. The data DATA-a and DATA-b, other control signals, and the like are also similar to the above. When outputs of the processors 101-1 and 101-2 match, regardless of the comparison result of the outputs of the processors 101-3 and 101-4, ADDR-a and DATA-a as outputs on the a side, that is, the processors 101-1 and 101-2 are selected and supplied to the memory 200 (case 1). In the case where outputs of the processors 101-1 and 101-2 do not match and outputs of the processors 101-3 and 101-4 match, it is determined that failure parts exist in the processors 101-1 and 101-2, and ADDR-b and DATA-b as outputs on the "b" side, that is, of the processors 101-3 and 101-4 are selected and supplied to the memory 200 (case 2). In the case where outputs of the processors 101-1 and 101-2 do not match and, further, outputs of the processors 101-3 and 101-4 also do not match, it is determined that at least two or more failure parts exist in the processors 101-1 to 101-4, and the microcontroller 100 stops operating and, after that, shifts to a recovering process such as resetting (case 3).

As described above, in the microcontroller 100 illustrated in the embodiment of FIG. 2, when outputs of at least two out of the four redundant processors 101-1 to 101-4 match, a failure in the processors as the cause of the output mismatch is masked and the matched outputs are set as correct outputs, so that the operation can be continued.

The microcontroller 100 illustrated in the embodiment of FIG. 4 has comparators 102-1, 102-2, and 102-3 and the selector 202 between the redundant three processors 101-1 to 101-3 and the memory 200. Address outputs of the processors 101-1 and 101-3 are input as ADDR-a and ADDR-b to the selector 202, and data outputs of the processors 101-1 and 101-3 are input as DATA-a and DATA-b to the selector 202. The comparator 102-1 compares outputs of the processors 101-1 and 101-2, the comparator 102-2 compares outputs of the processors 101-1 and 101-3, and the comparator 102-3 compares outputs of the processors 101-1 and 101-3 and outputs the comparison results to the selector 202 via not-illustrated signal lines and the like. The selector 202 outputs the address ADDR-a or ADDR-b selected by a selecting method illustrated in FIG. 5 or 6 to the memory 200. The data DATA-a and DATA-b, the other control signals, and the like are also similar.

The selecting method illustrated in FIG. 5 will be described. When outputs of the processors 101-1 and 101-2 match, regardless of a comparison result of the outputs of the processors 101-2 and 101-3, the "a" side, that is, ADDR-a and DATA-a as outputs of the processors 101-1 and 101-2 are selected and supplied to the memory 200 (Case 1). When outputs of the processors 101-1 and 101-2 do not match and outputs of the processors 101-2 and 101-3 match, it is determined that a failure part exists in the processor 101-1 and the "b" side, that is, ADDR-b and DATA-b as outputs of the processors 101-2 and 101-3 are selected and supplied to the memory 200 (Case 2). In the case where outputs of the processors 101-1 and 101-2 do not match and, further, outputs of the processors 101-2 and 101-3 also do not match, it is determined that at least two failure parts exist in the processors 101-1 to 101-3 and the microcontroller 100 stops operating and, after that, shifts to a recovering process such as resetting (Case 3).

The selecting method illustrated in FIG. 6 will be described. Since an address, data, and the like to be supplied to the memory 200 are selected by using comparison results of outputs in all of combinations in the three processors 101-1, 101-2, and 101-3, a majority logic which is more perfect than the selecting method illustrated in FIG. 5 is constructed.

In the case where comparison results of outputs in all of the combinations of the three processors 101-1, 101-2, and 101-3 match, the "a" side, that is, ADDR-a and DATA-a as outputs of the processor 101-1 are selected and supplied to the memory 200 (Case 1).

When outputs of the processors 101-1 and 101-2 do not match, outputs of the processors 101-2 and 101-3 match, and outputs of the processors 101-1 and 101-3 match, the "b" side, that is, ADDR-b and DATA-b as outputs of the processor 101-3 are selected and supplied to the memory 200 (Case 2).

When outputs of the processors 101-1 and 101-2 match, outputs of the processors 101-2 and 101-3 do not match, and outputs of the processors 101-1 and 101-3 match, the "a" side, that is, ADDR-a and DATA-a as outputs of the processor 101-1 are selected and supplied to the memory 200 (Case 3).

In the case where outputs of the processors 101-1 and 101-2 do not match, outputs of the processors 101-2 and 101-3 do not match and, outputs of the processors 101-1 and 101-3 match, the "a" side, that is, ADDR-a and DATA-a as outputs of the processor 101-1 are selected and supplied to the memory 200 (Case 4). In this case, it is determined that a failure occurs in the processor 101-2.

In the case where outputs of the processors 101-1 and 101-2 match, outputs of the processors 101-2 and 101-3 match and, outputs of the processors 101-1 and 101-3 do not match, the "a" side, that is, ADDR-a and DATA-a as outputs of the processor 101-1 are selected and supplied to the memory 200 (Case 5).

In the case where outputs of the processors 101-1 and 101-2 do not match, outputs of the processors 101-2 and 101-3 match and, outputs of the processors 101-1 and 101-3 do not match, the "b" side, that is, ADDR-b and DATA-b as outputs of the processor 101-3 are selected and supplied to the memory 200 (Case 6). In this case, it is determined that a failure occurs in the processor 101-1.

In the case where outputs of the processors 101-1 and 101-2 match, outputs of the processors 101-2 and 101-3 do not match and, outputs of the processors 101-1 and 101-3 do not match, the "a" side, that is, ADDR-a and DATA-a as outputs of the processor 101-1 are selected and supplied to the memory 200 (Case 7). In this case, it is determined that a failure occurs in the processor 101-3.

In the case where comparison results of outputs in all of the combinations of the three processors 101-1, 101-2, and 101-3 do not match, it is determined that at least two failure parts exist in the processors 101-1 to 101-3 and the microcontroller 100 stops operating and, after that, shifts to a recovery process such as resetting (Case 8).

In the case where only one combination indicates a mismatch and the other two combinations indicate a match in comparison results of outputs in all of combinations in the three processors 101-1, 101-2, and 101-3, that is, in the cases 2, 3, and 5, it is considered that a failure do not occur in any of the three processors 101-1 to 101-3 but occurs in any of the comparators 102-1 to 102-3.

As described above, in the microcontroller 100 illustrated in the embodiment of FIG. 4, when outputs of at least two out of the three redundant processors 101-1 to 101-3 match, a failure in the processors as the cause of the output mismatch is masked and the matched outputs are set as correct outputs, so that the operation can be continued.

In the case where the number of processors is generalized and set as "n", as illustrated in the embodiment of FIG. 7, the microcontroller 100 is configured by providing a majority circuit between "n" pieces of redundant processors 101-1 to 101-n and the memory 200. Although the value of "n" is arbitrary, when the specification on safety of the microcontroller 100 is set that in the case where there is one failure part, it is masked and the operation is continued, and in the case where there are two or more failure parts, the operation is stopped, the proper number of redundant processor is three or four. Further, as illustrated in FIGS. 2 and 4, at least two comparators 102-1 and 102-2 are provided and outputs of two processors out of the three or four redundant processors are compared by different comparators. Outputs (ADDR-a and ADDR-b) of the two processors compared by the different comparators are input to the 2-input selector 202. On the basis of a comparison result of match/mismatch by the two comparators, one of the input processor outputs is output to the memory 200. Since it is unnecessary to insert the comparator 102 in series to a propagation path of a signal from the processors 101-1 to 101-3 or 101-4 to the memory 200, the influence on propagation delay is small. Since the selector 202 is a 2-input selector of the minimum number of selection, propagation delay is small. That is, in the embodiments illustrated in FIGS. 2 and 4, in the microcontroller 100 having three or four redundant processors, the function equivalent to the majority circuit can be realized at extremely high speed.

Figure 8:
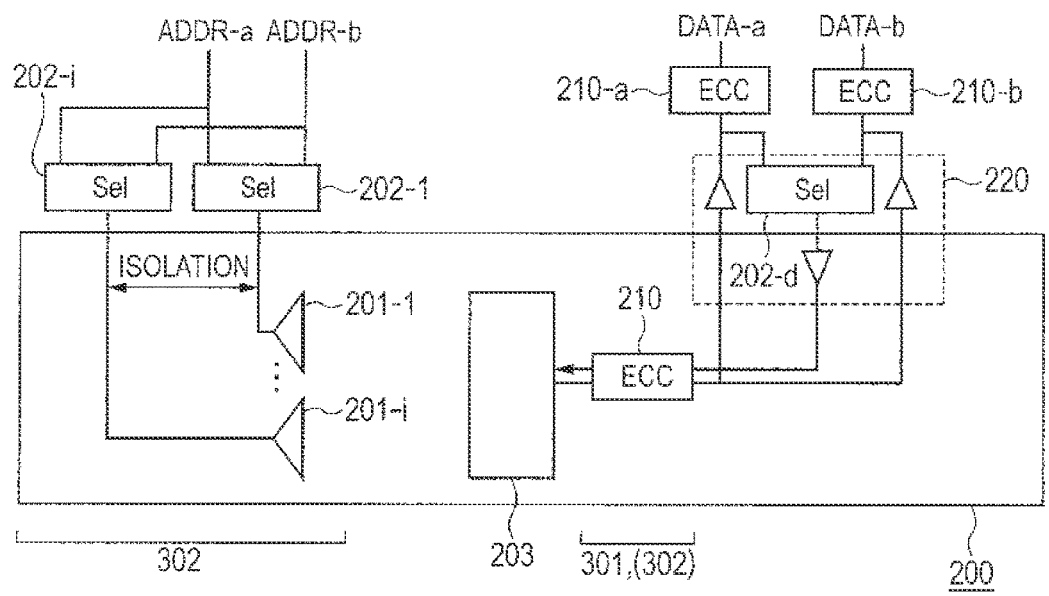
FIG. 8 is a block diagram illustrating a configuration example of a memory 200.

FIG. 8 illustrates a configuration example of the memory 200. Address decoders are redundant, and the above-described selectors 202 supplying an address to the address decoders are also redundant. Two addresses ADDR-a and ADDR-b as representatives of address outputs of the three or four redundant processors 101-1 to 101-3 or 101-4 having a circuit configuration similar to that of FIG. 2 or 4 are input to "i" pieces (i denotes natural number) of redundant selectors 202-1 to 202-i.

The addresses ADDR-a and ADDR-b are selected by the selectors 202-1 to 202-i by the selecting method described above with reference to FIGS. 3, 5, and 6 and input to the redundant address decoder 201-1 to 201-i of the same number. By providing the selectors 202-1 to 202-i in correspondence to the address decoders 201-1 to 201-i, respectively as described above, all of the address decoders are not influenced by a failure in the selectors 202-1 to 202-i. Further, to increase a failure isolation effect, isolation (taking distance) of the selectors 202-1 to 202-i, the address decoders 201-1 to 201-i, and address lines coupling the selectors 202-1 to 202-i and the address decoders 201-1 to 201-i is effective.

The two pieces of data DATA-a and DATA-b as representatives of data outputs of the three or four redundant processors 101-1 to 101-3 or 101-4 by a circuit configuration similar to that of FIG. 2 or 4 are selected by the selector 202-d and become write data which is input to the memory cell 203. The memory cell 203 is comprised of a plurality of word lines and a plurality of 1-bit storage elements which are selected by the word lines and can be accessed (read or written) in parallel by a plurality of bit lines. The memory cell 203 is also called a memory mat or a memory array.

Output data (read data) of the memory cell 203 is supplied as the data outputs DATA-a and DATA-b coupled to the processors 101-1 to 101-n via a buffer. Since a data signal is bidirectionally transmitted/received between the processors and the memory, write data is selected by the selector 202-d by a data interface 220 made by the selector 202-d and a tristate buffer, and read data is supplied to the data outputs DATA-a and DATA-b coupled to the processors 101-1 to 101-n. As an error correction circuit, there is a case that it is mounted as an error correction circuit 210 close to the memory cell 203 as illustrated in FIG. 8, and there is a case that it is mounted as error correction circuits 210-a and 210-b to the data outputs DATA-a and DATA-b coupled to the processors 101-1 to 101-n.

The redundant selectors 202-1 to 202-i and the redundant address decoders 201-1 to 201-i correspond to the address-system failure masking function 302. The error correction circuit 210 or the error correction circuits 210-a and 210-b become the data-system failure masking function 301 and, in the case of using an error correction code of a block unit, also become the address-system failure masking function 302.

Figure 9:
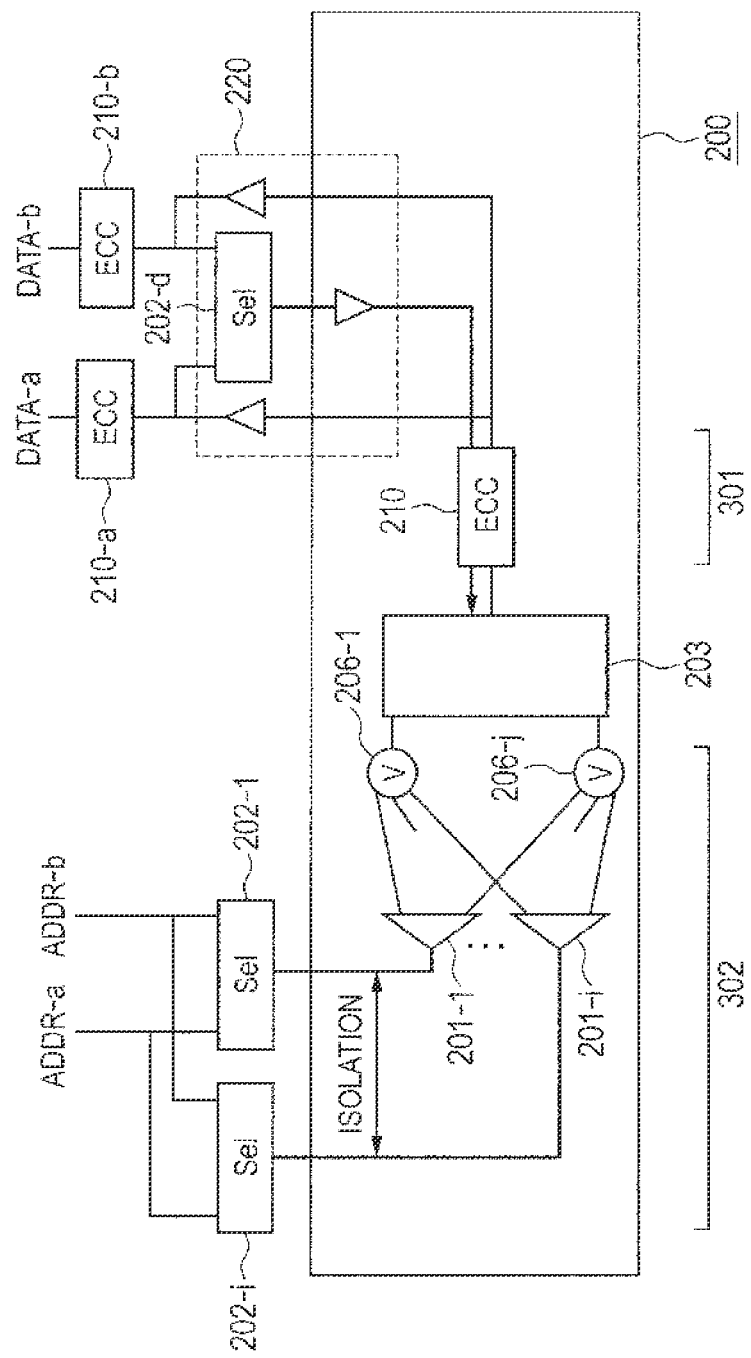
FIG. 9 is a block diagram illustrating a configuration example that a majority vote is taken among redundant address decoders in the memory 200.

FIG. 9 illustrates an example of the memory 200 having a configuration that address decoders are made redundant as the address-system failure masking function 302 and a majority vote is taken from outputs of the address decoders. The redundant address decoders 201-1 to 201-i are provided, a majority vote is taken from outputs of the address decoders 201-1 to 201-i at the majority circuits 206-1 to 206-i, and the memory cell 203 is selected by the outputs. j denotes the number of word lines of the memory cell 203. Also in the embodiment, by individually providing selectors 202-1 to 202-i in correspondence with the address decoders 201-1 to 202-i, all of the address decoders are prevented from being influenced by a failure in the selectors 202-1 to 202-i. Further, to increase the failure isolation effect, it is effective to isolate (space from one another) the selectors 202-1 to 202-i, the address decoders 201-1 to 201-i, and address lines coupling the selectors 202-1 to 202-i and the address decoders 201-1 to 201-i.

The redundant selectors 202-1 to 202-j, the address decoders 201-1 to 202-i, and the majority circuits 206-1 to 206-i correspond to the address-system failure masking function 302, and the error correction circuit 210 or the error correction circuits 210-a and 210-b correspond to the data-system failure masking function 301.

Therefore, according to the above-described embodiment, even any of the selectors 202-1 to 202-i fails, the influence of the failure is masked by majority vote. A failure in the data system is masked by an error correction code.

An example of the configuration of the memory 200 which is suitably coupled to the three or four redundant processors 101-1 to 101-3 or 101-4 has been described with reference to FIGS. 8 and 9. FIG. 10 illustrates a configuration example of the memory 200 suitable to the case where the number of redundant processors is "n" as a general number as illustrated in FIG. 7.

The memory 200 has "n" pieces of the redundant address decoders 201-1 to 201-n, which is the same number as the number of redundant processors. A majority circuit 103 illustrated in FIG. 7 is not illustrated, and address outputs ADDR-1 to ADDR-n of the processors 101-1 to 101-n are directly input to the address decoders 201-1 to 201-n. A majority vote is taken from the outputs of the address decoders 201-1 to 201-n by "j" pieces of majority circuits 206-1 to 206-j in the same manner as FIG. 9. By the output, a word line to be accessed in the memory cell 203 is selected.

Output data (read data) of the memory cell 203 is supplied to the processors 101-1 to 101-n via a buffer. The data interface 220 is provided with a majority circuit 103-d in place of the selector 202-d in the configuration example of FIG. 8, and the write data DATA-1 to DATA-n output from the processors 101-1 to 101-n is input and written into the memory cell 203 after majority logic. As an error correction circuit, like in FIG. 8, also in FIG. 10, there is a case that it is mounted as an error correction circuit 210 close to the memory cell 203, and there is a case that it is mounted as the error correction circuit 210-1 to 210-n coupled to the processors 101-1 to 101-n.

The redundant address decoders 201-1 to 201-n and the majority circuits 206-1 to 206-j correspond to the address-system failure masking function 302. The error correction circuit 210 or the error correction circuits 210-1 to 210-n become the data-system failure masking function 301.

Figure 11:
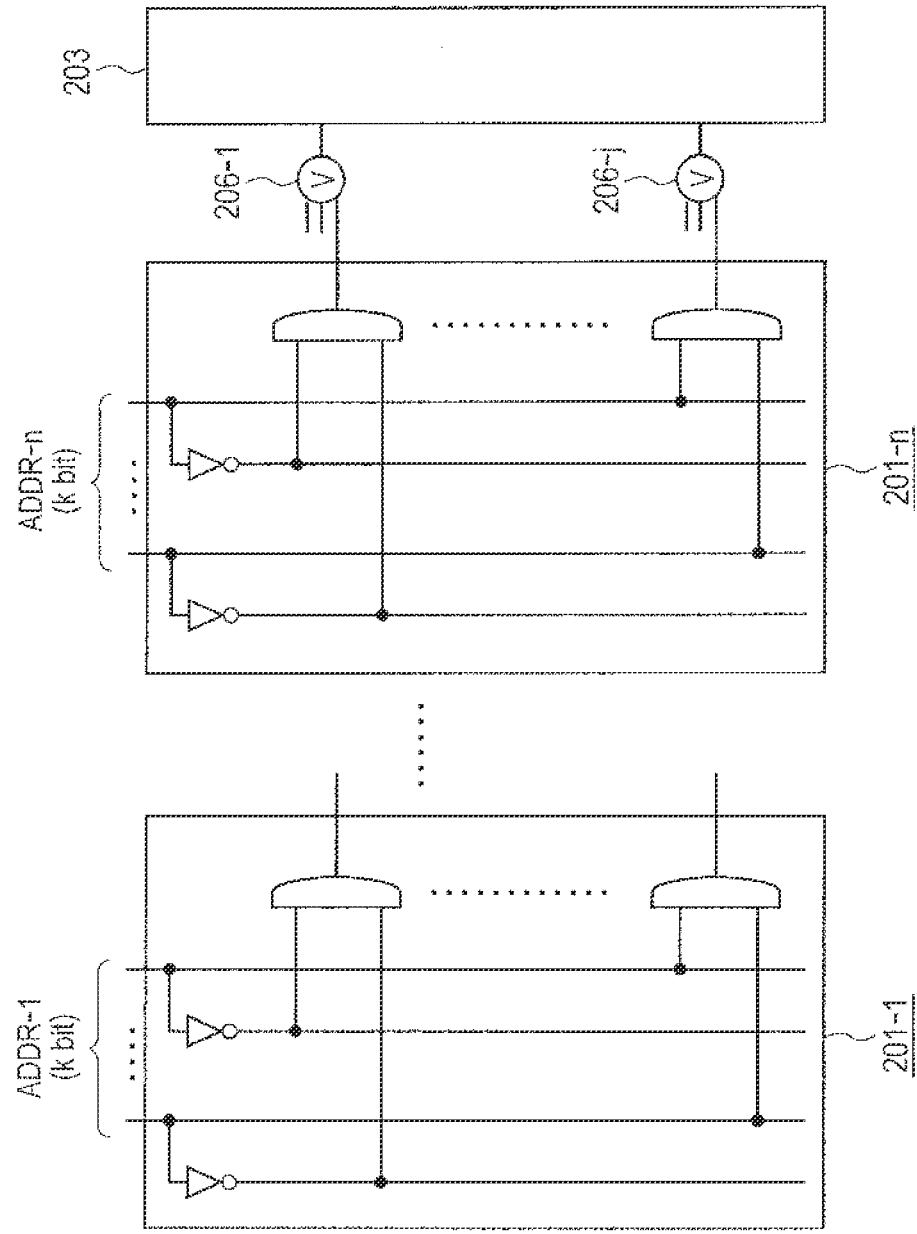
FIG. 11 is a block diagram illustrating a configuration example of redundant address decoders and a majority circuit in the embodiment of FIG. 10.

FIG. 11 is a block diagram illustrating a configuration example of the redundant address decoders 201-1 to 201-i and the majority circuits 206-1 to 206-j in the embodiment of FIG. 10. Outputs of the redundant address decoders 201-1 to 201-i are subjected to majority vote by the majority circuits 206-1 to 206-j, and the memory cell 203 is selected by the outputs of the majority circuits 206-1 to 206-j. The address decoders 201-1 to 201-i almost halve address signals and are divided into row decoders and column decoders, thereby enabling the circuit scale of the address decoders 201-1 to 201-i to be reduced.

Figure 12:
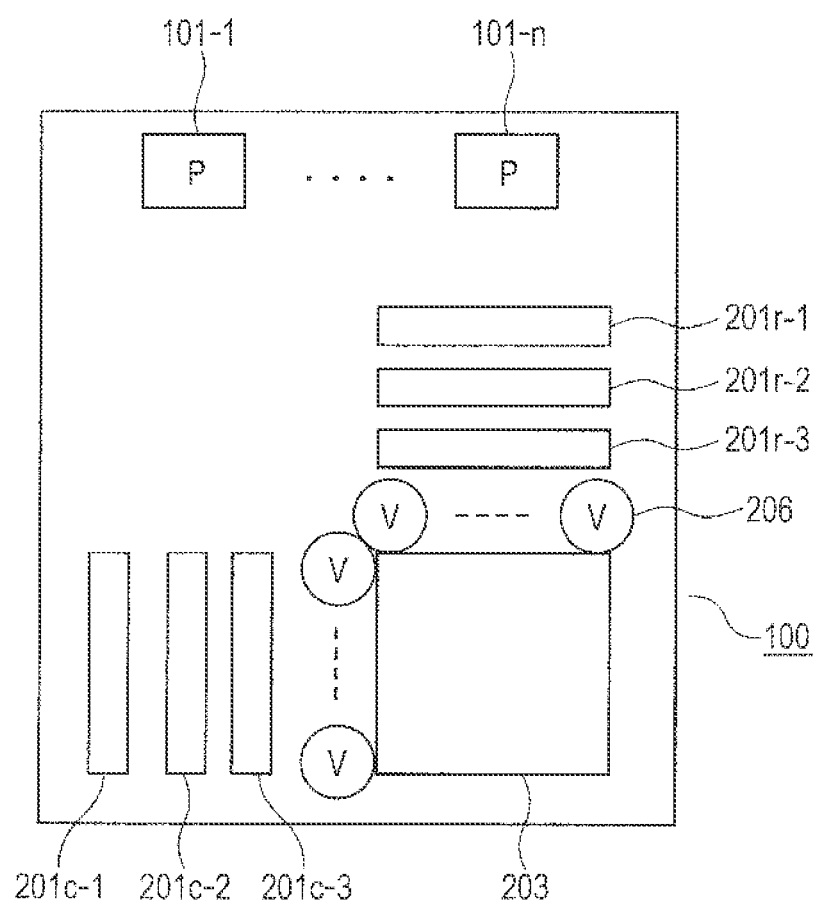
FIG. 12 is a schematic diagram illustrating an example of in-chip layout of redundant address decoders and a majority circuit in the embodiment of FIG. 10.

FIG. 12 is a schematic diagram illustrating an example of an in-chip layout of redundant address decoders and majority circuits in the embodiment of FIG. 10. The microcontroller 100 is configured by integrating devices on one chip, and n pieces of redundant processors 101-1 to 101-n are mounted. The redundant address decoders 201-1 to 201-n of the n pieces which is the same number are divided into two sides; the row side and the column side. Row decoders 201r-1 to 201r-n are disposed along one of sides of the memory cell 203, and column decoders 201c-1 to 201c-n are disposed along another one side which is perpendicular to the one side. Between the row decoders 201r-1 to 201r-n and the memory cell 203 and between the column decoders 201c-1 to 201c-n and the memory cell 203, the majority circuits 206-1 to 206-j are disposed. As described above, the address decoders 201-1 to 201-n are divided into the row decoders 201r-1 to 201r-i and the column decoders 201c-1 to 201c-i. Majority vote is taken by the majority circuits 206-1 to 206-j for each of the row decoders 201r-1 to 201r-i and the column decoders 201c-1 to 201c-i, and the memory cell 203 is selected by an output of the majority vote. In such a manner, the circuit scale and the chip area of the address decoders can be reduced.

Figure 13:
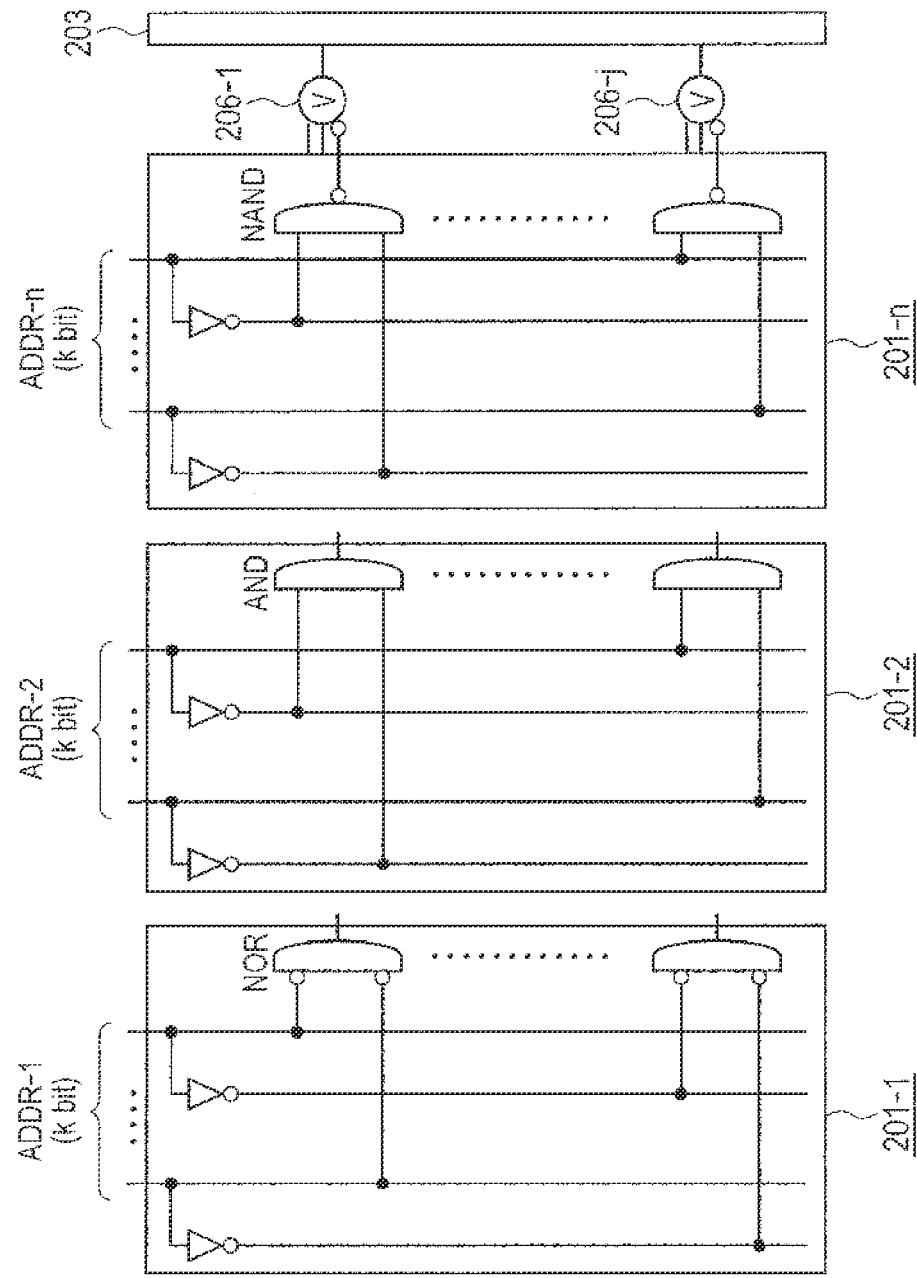
FIG. 13 is a block diagram illustrating another configuration example of redundant address decoders and a majority circuit in the embodiment of FIG. 10.

FIG. 13 is a block diagram illustrating a configuration example different from FIG. 11, of redundant address decoders and majority circuits in the embodiment of FIG. 10. FIG. 11 illustrates an example that all of the n pieces of redundant address decoders 201-1 to 201-n are configured by the same circuits. Specifically, a lane of positive logic and a lane of negative logic are formed by inverters from each address made of k bits. AND is obtained by an AND gate from logic values input from any one of the lanes on the positive and negative logic sides, and a decoded output is generated. On the other hand, FIG. 13 illustrates an example that the n pieces of redundant address decoders 201-1 to 201-n are not always configured by the same logic circuits. Circuits forming lanes of positive and negative logics by inverters from each address made of k bits are the same as those of FIG. 11. FIG. 13 is different with respect to the point that logical operation is performed not only by an AND gate but also by various logic gates to generate a decoded output. Accompanying the operation, the lane of positive logic or the lane of negative logic from which a logic value is to be input to each of the logic gates is adjusted. For example, an NOR gate is used in the address decoder 201-1, an AND gate is used in the address decoder 201-2, and an NAND gate is used in the address decoder 201-n. The relation of positive logic/negative logic of decoded outputs is adjusted by setting input terminals of the majority circuits 206-1 to 206-j to positive logic input or negative logic input. By the adjustment, the probability that the same failure occurs in the redundant address decoders 201-1 to 201-i, and the effect of redundancy is more improved.

Second Embodiment

In the first embodiment, as modes of realizing the address-system failure masking function 302, various configuration examples of making the address decoders of the memory 200 redundant have been described. In the second embodiment, as another mode of realizing the address-system failure masking function 302, an address decoder and an error correction circuit using a code for correcting/detecting an error on a block unit basis are provided for each of blocks obtained by dividing the memory 200 by bit slices. An embodiment of realizing combination of the data-system failure masking function 301 and the address-system failure masking function 302 will be described.

Figure 14:
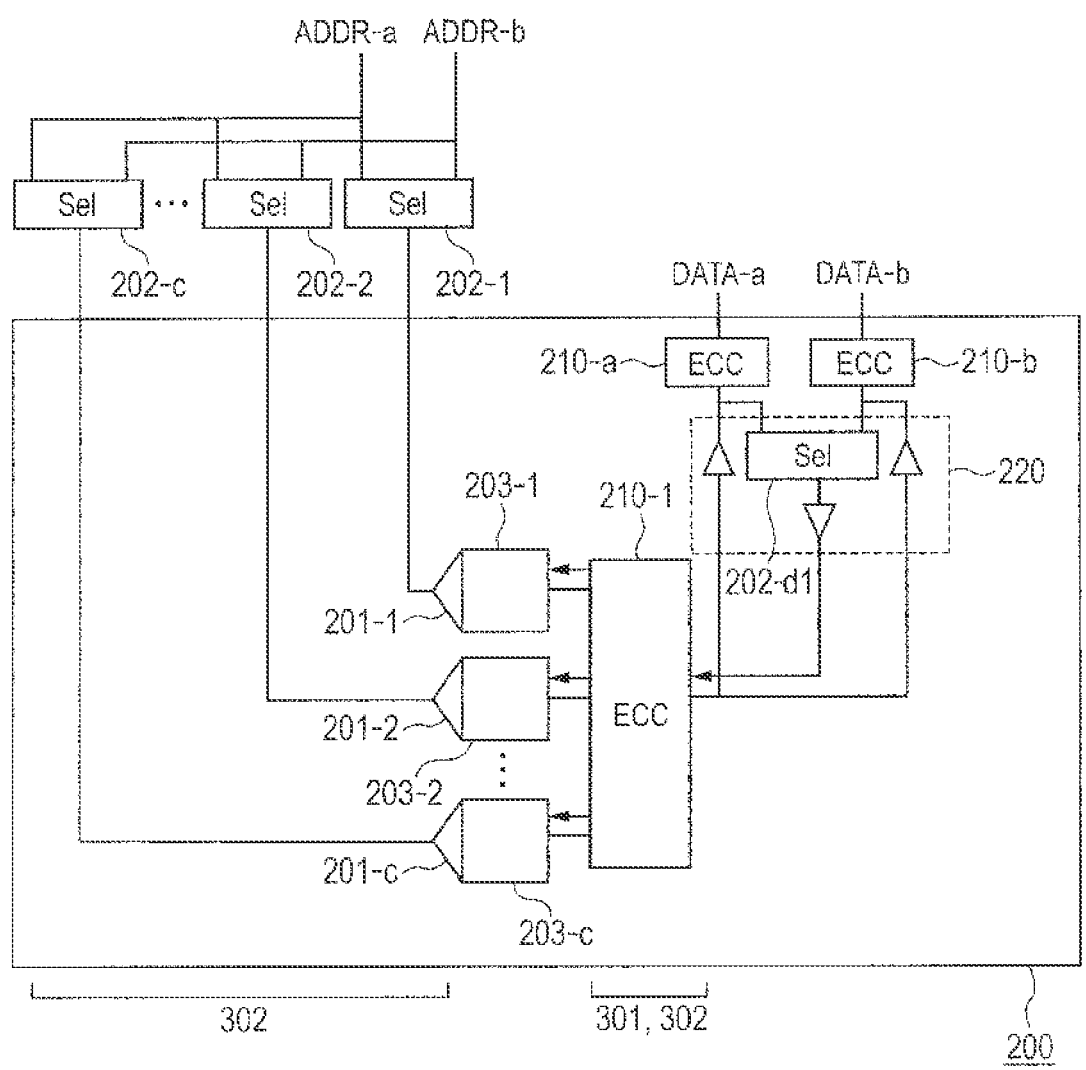
FIG. 14 is a block diagram illustrating a configuration example of the memory 200 in a second embodiment.

FIG. 14 illustrates a configuration example of the memory 200 in which a failure in an address system can be masked by an error correction code which can mask an error on the block unit basis. As an error correction code which can mask an error on the block unit basis, a Reed-Solomon code can be used.

In the Reed-Solomon code, a symbol made by a plurality of bits is a unit of an error correction, and a code word is comprised of a data part and a code part (redundant part) each made of predetermined number of symbols. The memory 200 is made of a plurality of words each made of a plurality of bits. By associating one code word with one word, error correction/error detection is executed each time a word is read. In the embodiment, one word in the memory 200 is divided to blocks each made of a plurality of bits. The number of bits of each block is set to equal to or less than the number of bits of one symbol. When the number of bits of one block is less than the number of bits of one symbol, a known value is compensated for an insufficient bit. An error correction circuit adds the known value to one word read from the memory 200 and performs an error correction. Also when the number of blocks is smaller than the number of symbols constructing a code word, similarly, a known bit string is compensated for an insufficient symbol. An error correction circuit adds the known bit string to one word read from the memory 200 and performs an error correction.

The memory 200 has memory cells 203-1 to 203-$c$ ($c$ denotes a natural number) and address decoders 201-1 to 201-$c$ corresponding to the memory cells 203-1 to 203-$c$, respectively. In a manner similar to the first embodiment described with reference to FIG. 8, the redundant selectors 202-1 to 202-$c$ are coupled to the address decoders 201-1 to 201-$c$, respectively. To the selectors 202-1 to 202-$c$, two addresses ADDR-a and ADDR-b representing address outputs of the three or four redundant processors 101-1 to 101-3 or 101-4 having a circuit configuration similar to that of FIG. 2 or 4 are input. By providing the selectors 202-1 to 202-$c$ respectively in correspondence with the address decoders 201-1 to 201-$c$, it is configured so that the selector 202 does not become a single point of failure.

Output data (read data) of the memory cells 203-1 to 203-$c$ is output via a buffer as data outputs DATA-a and DATA-b to be supplied to the processors 101-1 to 101-$n$. Since a data signal is transmitted bidirectionally between the processors and the memory, write data is selected by a selector 202-$d$-1 in the data interface 220 made by the selector 202-$d$-1 and a tristate buffer, and the same data as read data is supplied to the data outputs DATA-a and DATA-b to be coupled to the processors 101-1 to 101-$n$. Also in FIG. 14, there is the case that the error correction circuit is mounted as the error correction circuit 210-1 close to the memory cells 203-1 to 203-$c$ like in FIG. 8 and there is also the case that the error correction circuit is mounted as error correction circuits 210-$a$ and 210$b$ for the data outputs DATA-a and DATA-b to be coupled to the processors 101-1 to 101-$n$.

Figure 23:
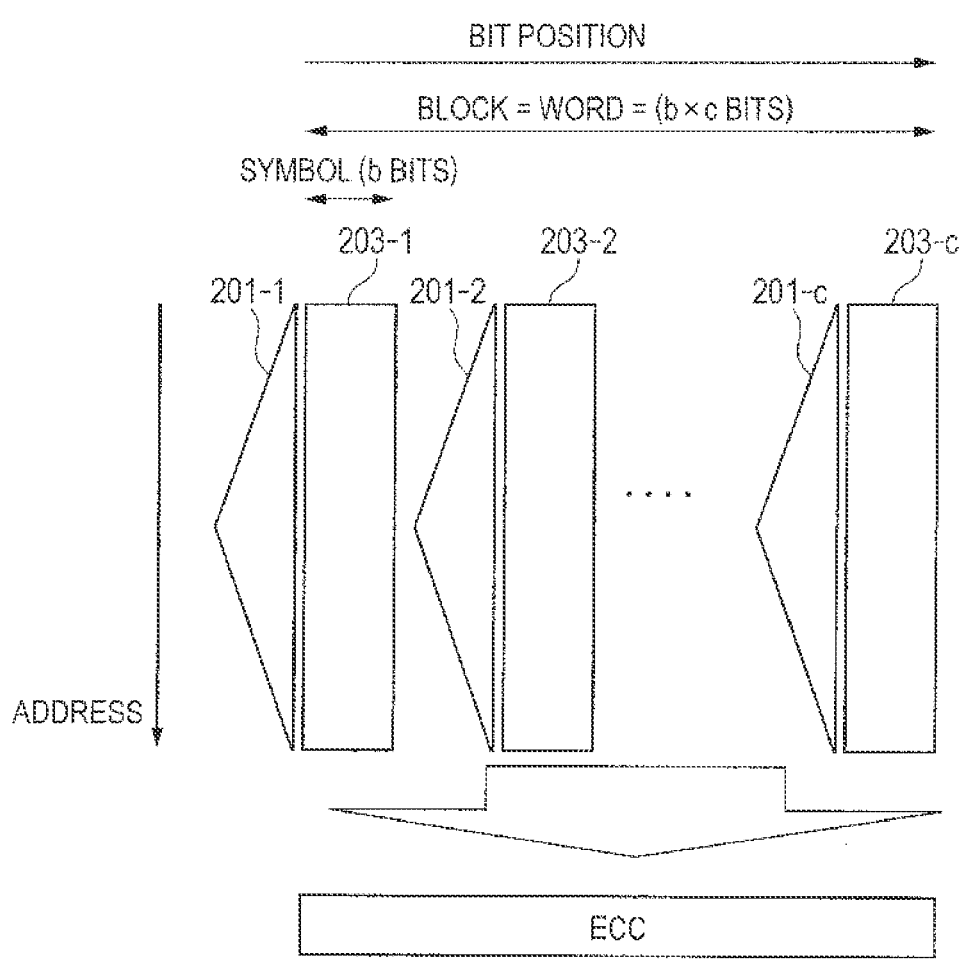
FIG. 23 is an explanatory diagram for explaining error correcting operation of the memory of the second embodiment.

An error correcting operation of the memory 200 of the second embodiment will be described with reference to FIG. 23. An error correction code used for an error correction in the memory 200 is a code word of a Reed-Solomon code made by a data part of a c1 symbol and a code part (redundant part) of two symbols, and c1+c2=c (c1, c2, and c are natural numbers). For example, when the code part is two symbols (c2=2), the correction capability of ECC is 1-symbol error correction 2-symbol error detection. The memory 200 is made of L words, and the number of bits per word is expressed by b×c bits as the product of the number "b" of bits per symbol and the number "c" of code words (L and b are natural numbers). The memory cell is comprised of the memory cells 203-1 to 203-$c$ obtained by dividing one word to c pieces of blocks every b bits corresponding to one symbol. The address decoders 201-1 to 201-$c$ corresponding to the memory cells 203-1 to 203-$c$ are provided. Since one word of b×c bits read in parallel from the memory cells 203-1 to 203-$c$ is a code word of the Reed-Solomon code made by the data part of c1 symbol and the code part of c2 symbols, according to the above-described example (c2=2), 1-symbol error correction 2-symbol error detection can be performed by ECC.

In normal operation, the same address values determined as correct by the vote circuit 103 or the like are input in parallel to the c pieces of address decoders 201-1 to 201-$c$, and the same word is selected in the c pieces of memory cells 203-1 to 203-$c$. In the case where an error occurs in data in any one of the memory cells 203-1 to 203-$c$, the error is corrected by an ECC. When an error occurs in any two places, occurrence of the two errors (two symbols) is detected by an ECC. Since one error (one symbol) is corrected and masked and the operation is continued, the data-system failure masking function 301 is performed. In the case where an error occurs due to a failure in one of addresses which are input in parallel to the c pieces of address decoders 201-1 to 201-$c$, or in the case where a failure occurs in any one of the c pieces of address decoders 201-1 to 201-$c$, a (erroneous) word different from the same (correct) word is selected in a corresponding memory cell in the c pieces of memory cells 203-1 to 203-$c$. Data read in parallel from the c pieces of memory cells 203-1 to 203-$c$ enters a state where an error occurs in the data (symbol) read from the memory cell in which the erroneous word is selected. When the error occurs in one point (one symbol), it is corrected. When the error occurs in two points, occurrence of the errors is detected. As described above, one error occurring in a plurality of addresses which are input in parallel or in the c pieces of address decoders 201-1 to 201-$c$ is corrected and masked, and the operation is continued. Consequently, the address-system failure masking function 302 is performed.

In such a manner, the same error correction circuit ECC (in FIG. 14, which is mounted as the error correction circuit 210-1 or the error correction circuits 210-$a$ and 210-$b$) is used to realize both of the data-system failure masking function 301 and the address-system failure masking function 302. In the case where a failure occurs in both of the data system and the address system, if it appears as an error in the same symbol by chance, the error is corrected and masked, and the operation is continued. However, an error appears in two different symbols, two errors are detected and the operation is stopped.

Figure 15:
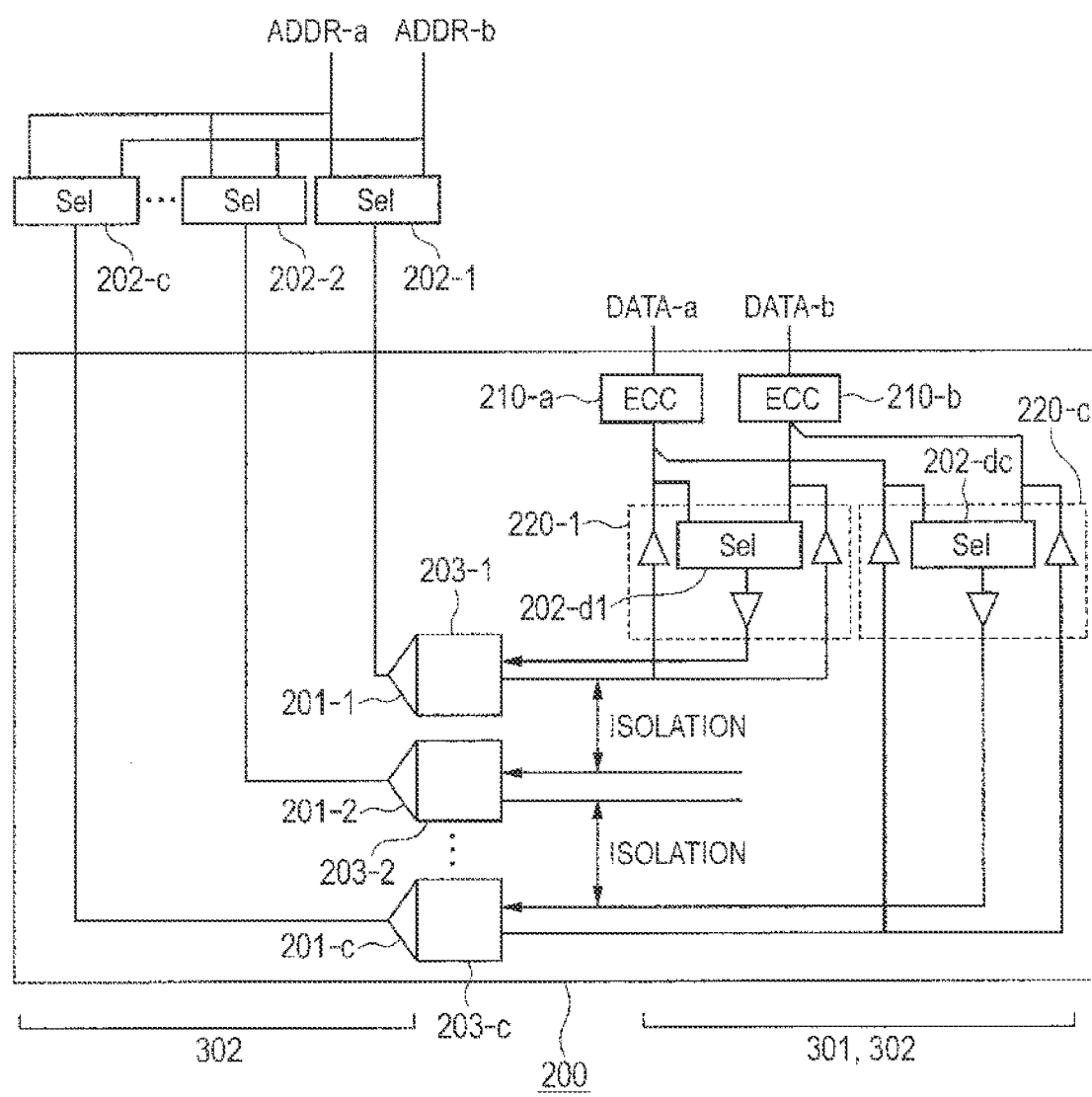
FIG. 15 is a block diagram illustrating another configuration example of the memory 200 in the second embodiment.

FIG. 15 is a block diagram illustrating another configuration example of the memory 200 of the second embodiment. Although only one data interface circuit 220 is provided in FIG. 14, in the memory 200 illustrated in FIG. 15, data interfaces 220-1 to 220-$c$ made by selectors 202-$d$1 to 202-$dc$ and tristate buffers are provided independently of one another on the block unit basis. In FIG. 15, the error correction circuit cannot be mounted as the error correction circuit 210-1 close to the memory cells 203-1 to 203-$c$ as illustrated in FIG. 8 or 14 but is mounted as the error correction circuits 210-$a$ and 210$b$ to the data outputs DATA-a and DATA-b coupled to the processors 101-1 to 101-$n$. Since the other configuration is similar to the memory 200 illustrated in FIG. 14, the description will not be repeated. By mounting the error correction circuit as the error correction circuits 210-$a$ and 210-$b$ for the data outputs DATA-a and DATA-b coupled to the processors 101-1 to 101-$n$, a failure in the data interfaces 220-1 to 220-$c$ corresponding to the data interface 220 as a single block can be masked. When a failure occurs in any of buffers in the data read system of the data interfaces 220-1 to 220-$c$, error correction/error detection is performed in the correction circuits 210-$a$ and 210-$b$. In the case where a failure occurs in any of the selectors 202-$d$1 to 202-$dc$ in the data write system or a buffer coupled to the selectors, data in which an error occurs is written in a memory cell having a correspondence address. Consequently, when the data is read, the error is corrected/detected by the error correction circuits 210-$a$ and 210-*b*. In any of the cases, the data-system failure masking function 301 is performed.

Figure 16:
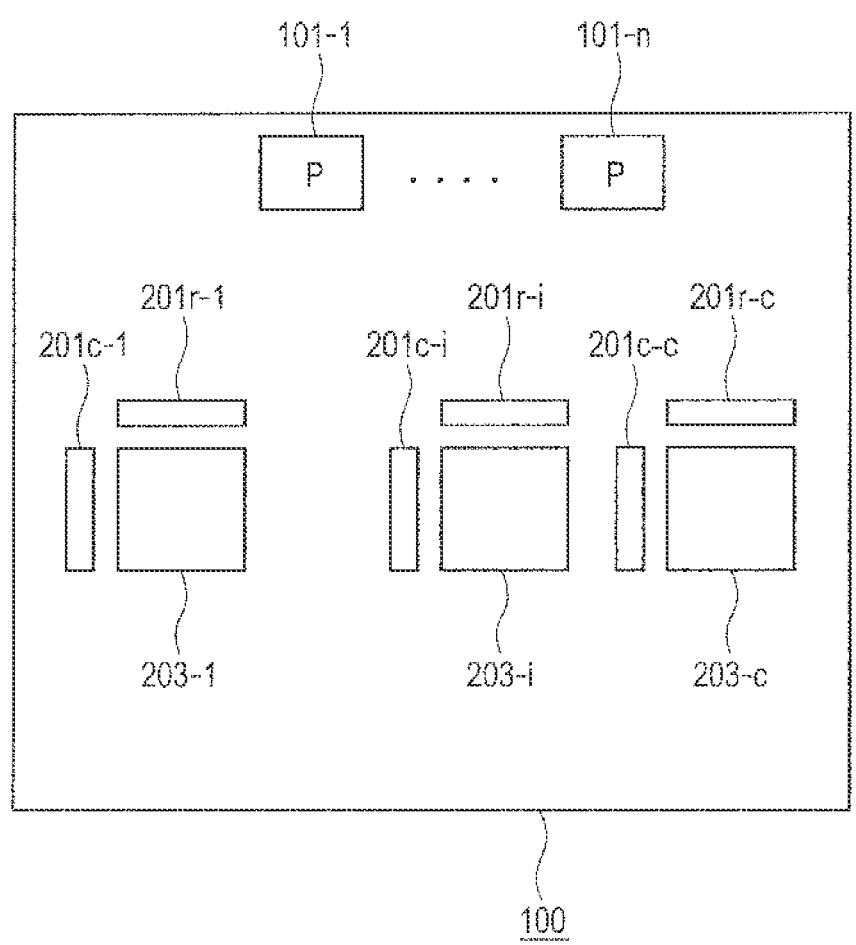
FIG. 16 is a schematic diagram illustrating an example of an in-chip layout of a microcontroller 100 in the second embodiment.

FIG. 16 is a schematic diagram illustrating an example of an in-chip layout of the microcontroller 100 of the second embodiment. The microcontroller 100 is constructed so as to be integrated on one chip and n pieces of redundant processors 101-1 to 101-*n* are mounted. Further, c pieces of redundant address decoders 201-1 to 201-*c* and memory cells 203-1 to 203-*c* are disposed. The address decoders 201-1 to 201-*c* are divided into row decoders 201*r*-1 to 201*r*-*c* and column decoders 201*c*-1 to 201*c*-*c* and are disposed along vertical and horizontal sides of the memory cells 203-1 to 203-*c*, respectively. Different from FIG. 12, it is unnecessary to provide a majority circuit between an address decoder and a memory cell, so that a normal memory which is prepared in a library or can be combine by an RAM compiler can be used. Consequently, a man-hour for developing a memory having redundant address decoders and a majority circuit as illustrated in FIG. 12 is not required, so that the development man-hour and development cost can be suppressed to be low.

FIGS. 17 to 19 illustrate configuration parameters constructing code words of Reed-Solomon codes and overheads in memories of 32-bit width, 64-bit width, and 128-bit width, respectively. "b" in the configuration parameter indicates the number of bits constructing one symbol, and n denotes the total number of bits (the upper limit on an algorithm) of a code word obtained by combining the data part and the redundant part (code part) of a Reed-Solomon code at that time. $n=b(2^b-1)$ bits and $n/b=2^b-1$ symbol. For 1-symbol (1S) error correction in the code word, redundant bits of the amount of two symbols are necessary. For 2-symbol (2S) error detection, redundant bits of the amount of three symbols are necessary. The remaining bits can be used as data bits of the data part. k denotes the number of data bits in the case where 1-symbol error correction is possible, and $k=b(2^b-3)$. That is, a code word of a Reed-Solomon code is comprised of a data part of k ($=b(2^b-3)$) bits and a redundant part (code part) of 2b bits. When k is smaller than the bit width of the memory (set as W bits), an error correction is performed by applying a plurality of code words (data part+redundant part) in parallel. The number of code words applied in parallel is an integer larger than W/k and closest to W/k. For example, when the bit width (W) of the memory is larger than twice of k and smaller than three times of k, three code words to be applied in parallel are applied.

In "decoder" in the "overhead" field, the number c of the address decoders 201-1 to 201-*c*, corresponding to the number c of division of the memory cells 203-1 to 203-*c* is indicated. In the number of symbols $n/b=2^b-1$ (the upper limit in the algorithm) of a code word constructed by a symbol of "b" bits, data actually written in the memory 200 and redundant bits corresponding to the data correspond to the number of symbols assigned. Since data actually written in the memory 200 is 32 bits, 64 bits, 128 bits, and the like, when the k bits of the data bits is larger than the number of bits, the data becomes unused bits or an unused symbol and is handled as a predetermined value of 0 or the like.

FIG. 17 illustrates configuration parameters constructing code words and overheads in a memory of 32-bit width. In a memory of 32-bit width, when b=4, the overhead of redundant bits becomes the minimum. Since the number of bits of the code word when b=4 is $n=4(2^4-1)=60$ bits and the data bits $k=4(2^4-3)=52$ bits, to store data of 32-bit width, 32 bits (8 symbols) in the 52 bits (13 symbols) are used. By adding eight bits (2 symbols) as redundant bits for 1-symbol (1S) error correction to this data, a memory is configured. The memory is divided to blocks by symbols and is divided to ten memory cells 203-1 to 203-10 in correspondence with 8+2 symbols, and ten address decoders 201-1 to 201-10 are provided.

When b is smaller than four bits, k is smaller than the bit width of the memory, so that the bit width is divided, a Reed-Solomon code has to be applied, and larger redundant bits become necessary. For example, when b=3, the number of bits of the code word is $n=3(2^3-1)=21$ bits, and data bits $k=3(2^3-3)=15$ bits. To store data of 32-bit width, three code words have to be applied. Since the data bits k=15 bits (five symbols)+redundant bits of six bits (two symbols) per code word, in three code words, the data bits 45 bits (15 symbols)+redundant bits of 18 bits (six symbols). As described above, the number of redundant bits of 18 bits in the case of b=3 is larger than the number of redundant bits of eight bits (two symbols) in the case of b=4. To store data of 32-bit width, 33 bits (11 symbols) out of the data bits of 45 bits (15 symbols) are used. The number of memory cells actually used is 17 and the number of address decoders also becomes 17.

On the other hand, when b is larger than four bits, redundant bits of two symbols are unconditionally necessary for 1-symbol error correction, and redundant bits of three symbols are unconditionally necessary for 2-symbol error detection. Since the number of bits per symbol increases, more redundant bits become necessary. When b=5, 6, and 7, the number of redundant bits necessary for 1-symbol (1S) error correction increases as 10, 12, and 14, respectively.

As described above, in the memory of 32-bit width, when a Reed-Solomon code of b=4 is used, the overhead of redundant bits becomes the minimum, and it is optimum. Similarly, in memories of 64-bit width and 128-bit width, as illustrated in FIGS. 18 and 19, when b=5, the overhead of redundant bits becomes the minimum.

FIG. 20 illustrates a configuration example of the memory 200 having 32-bit width which is block-divided. As described above, to configure a memory of 32-bit width, it is optimum to apply a Reed-Solomon code in which one symbol is made of four bits (b=4), and the memory is divided into ten blocks corresponding to data bits of 32 bits (eight symbols) and redundant bits of eight bits (two symbols). That is, the memory 200 has ten memory cells 203-1 to 203-8, 203-*c*1, and 203-*c*2 and ten address decoders 201-1 to 201-8, 201-*c*1, and 201-*c*2. The data bits of 32 bits (eight symbols) are stored in the memory cells 203-1 to 203-8, and the redundant bits of eight bits (two symbols) are stored in the memory cells 203-*c*1 and 203-*c*2.

FIG. 21 illustrates a configuration example of the memory 200 having 64-bit width which is block-divided. In the memory of 64-bit or 128-bit width, as illustrated in FIG. 21, it is optimum to divide the memory into blocks each having a 5-bit width. As described above, at the time of constructing a memory of 64-bit or 128-bit width, it is optimum to apply a Reed-Solomon code in which one symbol is made of five bits (b=5). The memory is divided into 15 blocks corresponding to data bits of 64 bits (13 symbols) and redundant bits of 10 bits (two symbols). That is, the memory 200 has 15 memory cells 203-1 to 203-13, 203-*c*1, and 203-*c*2 and 15 address decoders 201-1 to 201-13, 201-*c*1, and 201-*c*2. Each of the memory cells 203-1 to 203-12 has a 5-bit width, and data bits of 60 bits (12 symbols) are stored in the memory cells 203-1 to 203-12. The memory cell 203-13 has a 4-bit width and stores the remaining four bits (one symbol). Each of the memory cells 203-*c*1 and 203-*c*2 has a 5-bit width, and redundant bits of 10 bits (two symbols) are stored in the memory cells 203-c1 and 203-c2. Although the memory cell 203-13 is constructed in 4-bit width, one bit which is always 0 is compensated to virtually form a symbol of five bits, and the memory cell 203-13 can be coded/decoded as a Reed-Solomon code that one symbol is made of five bits (b=5). The bit which is always 0 is omitted in actual operation, so that the operation amount and the arithmetic circuit are reduced.

FIG. 22 illustrates a configuration example of the memory 200 having 64-bit width which is block-divided and enables partial write. There is a case that a memory access from a processor includes partial write executed in a unit smaller than a bit width of an actual memory such as a byte (8-bit) unit, a word (16-bit) unit, or a long word (32-bit) unit. To construct a memory so as to be able to be adapted to partial write, as illustrated in FIG. 22, it is optimum to divide the memory to blocks of four-bit width and construct the coding part by blocks each having a width of five bits. That is, the memory 200 has 18 memory cells 203-1 to 203-16, 203-c1, and 203-c2 and 18 address decoders 201-1 to 201-16, 201-c1, and 201-c2. The memory cells 203-1 to 203-16 have 4-bit width and store data bits of 64 bits (16 symbols), and the memory cells 203-c1 and 203-c2 have 5-bit width and store redundant bits of 10 bits (2 symbols). By making each of the blocks have a 4-bit width, a configuration suitably adapted to partial write is obtained. In this case, even when the memory cell of the data part is made of four bits, by adding one virtual bit which is always 0 and virtually handling the resultant as five bits, the memory cell can be coded/decoded as a Reed-Solomon code that one symbol is made of five bits. The operation amount and the circuit scale of the amount that a bit which is always 0 is included are reduced.

Although the present invention achieved by the inventors have been concretely described above on the basis of the embodiments, obviously, the present invention is not limited to the foregoing embodiments and can be variously changed without departing from the gist.

For example, the processor may be a processor of any architecture and may be, for example, a DSP (Digital Signal Processor) or a dedicated processor constructing an accelerator having no name. Further, the processor can be always changed to another subject which accesses a memory.

What is claimed is:

1. A microcontroller comprising three or more processors and a storage device,
    wherein the three or more processors are configured to execute a same process in parallel,
    wherein the storage device includes a non-redundant memory mat having storage regions each corresponding to an address issued at a time of an access by a processor, an address selection part selecting a storage region in the memory mat on a basis of three or more addresses issued at a time of an access by the three or more processors, a data output part reading data from the storage region in the memory mat selected by the address selection part, and a failure recovery part correcting or masking a detected failure which occurs in the memory mat, the address selection part, or the data output part, and
    wherein the address selection part comprises a plurality of address decoders and a majority logic circuit which selects the selected storage region by a result of majority vote of outputs of the plurality of address decoders.

2. The microcontroller according to claim 1,
    wherein the memory mat comprises L words each corresponding to one of the storage regions and each made of W bits (W and L are natural numbers),
    wherein the plurality of address decoders each output to the majority logic circuit a selection signal selecting one word from the L words on a basis of an address supplied, and
    wherein the majority logic circuit selects one word from the L words of the memory mat as the selected storage region.

3. The microcontroller according to claim 2, wherein the failure recovery part performs 1-bit error correction 2-bit error detection on data read from the memory mat.

4. The microcontroller according to claim 2,
    wherein the microcontroller has first, second, and third processors as the three or more processors,
    wherein the first, second, and third processors issue first, second, and third addresses, respectively, to access the storage device,
    wherein the microcontroller further comprises a first comparator comparing the first and second addresses, a second comparator comparing the second and third addresses, and a plurality of selectors to which the first and third addresses are supplied and which supplies, on a basis of a comparison result of the first and second comparators, any one of the first and third addresses to a corresponding address decoder, and
    wherein each of the plurality of selectors is a circuit which supplies the first address to a corresponding address decoder when a comparison result of the first comparator indicates that the first and second addresses are equal to each other, and which supplies the third address to a corresponding address decoder when a comparison result of the first comparator indicates that the first and second addresses are not equal to each other and a comparison result of the second comparator indicates that the second and third addresses are equal to each other.

5. The microcontroller according to claim 2,
    wherein the microcontroller has first, second, third, and fourth processors as the three or more processors,
    wherein the first, second, third, and fourth processors issue first, second, third, and fourth addresses, respectively, to access the storage device,
    wherein the microcontroller further comprises a first comparator comparing the first and second addresses, a second comparator comparing the third and fourth addresses, and a plurality of selectors to which the first and third addresses are supplied and which supplies, on a basis of a comparison result of the first and second comparators, any one of the first and third addresses to a corresponding address decoder, and
    wherein each of the plurality of selectors is a circuit which supplies the first address to a corresponding address decoder when a comparison result of the first comparator indicates that the first and second addresses are equal to each other, and which supplies the third address to a corresponding address decoder when a comparison result of the first comparator indicates that the first and second addresses are not equal to each other and a comparison result of the second comparator indicates that the third and fourth addresses are equal to each other.

6. The microcontroller according to claim 2,
    wherein each of the plurality of address decoders has a row decoder and a column decoder.

7. The microcontroller according to claim 1,
wherein the three or more processors and the storage device are configured on a single semiconductor substrate.

8. An electronic control device on which the microcontroller described in claim 1 is mounted.

9. The microcontroller according to claim 1,
wherein the address selection part comprises a plurality of redundant address decoders each outputting a selection signal selecting a storage region on a basis of an address supplied.

10. A microcontroller comprising three or more processors and a storage device,
wherein the three or more processors are configured to execute a same process in parallel,
wherein the storage device includes a non-redundant memory mat having storage regions each corresponding to an address issued at a time of an access by a processor, an address selection part selecting a storage region in the memory mat on a basis of three or more addresses issued at a time of an access by the three or more processors, a data output part reading data from the storage region in the memory mat selected by the address selection part, and a failure recovery part correcting or masking a detected failure which occurs in the memory mat, the address selection part, or the data output part,
wherein the failure recovery part is configured to execute an error correction on a code word of c symbols of a Reed-Solomon code using b bits as one symbol, on data read from the memory mat (b and c are natural numbers),
wherein the memory mat comprises L words each corresponding to one of the storage regions, each made of W bits (W and L are natural numbers) and each divided into a plurality of partial memory mats of L words each made of b bits or less,
wherein the address selection part comprises a plurality of address decoders each outputting a selection signal selecting one word from the L words on a basis of an address supplied and each associated with a respective one of the plurality of partial memory mats,
wherein a number of the plurality of partial memory mats is a plural number less than or equal to c, and
wherein a number of the plurality of address decoders is equal to the number of the plurality of partial memory mats.

11. The microcontroller according to claim 10,
wherein the failure recovery part executes the error correction by adding at least one bit of known value to data read from the partial memory mat when the number of bits per word is less than the b bits in each word of the plurality of partial memory mats, and
wherein the failure recovery part executes the error correction by adding a known bit string to data read from the plurality of partial memory mats when the number of the plurality of partial memory mats is less than c.

12. The microcontroller according to claim 10,
wherein the failure recovery part is configured to execute an error correction on data read from the memory mat using a code word of 10 symbols of a Reed-Solomon code and four bits as one symbol,
wherein the L words are each made of 32 bits and are divided into 10 partial memory mats of L words each made of four bits, and
wherein the address selection part comprises a plurality of address decoders each outputting a selection signal selecting one word from the L words on a basis of an address supplied and each associated with a respective one of the 10 partial memory mats.

13. The microcontroller according to claim 10,
wherein the failure recovery part is configured to execute an error correction on data read from the memory mat using a code word of 15 symbols of a Reed-Solomon code and five bits as one symbol,
wherein the L words are each made of 64 bits and are divided into 14 partial memory mats of L words each made of five bits and one partial memory mat of L words each made of four bits, and
wherein the address selection part comprises a plurality of address decoders each outputting a selection signal selecting one word from the L words on a basis of an address supplied and each associated with a respective one of the 15 partial memory mats.

14. The microcontroller according to claim 10,
wherein the failure recovery part is configured to execute an error correction on data read from the memory mat using a code word of 18 symbols of a Reed-Solomon code and five bits as one symbol,
wherein the L words are each made of 64 bits and are divided into 18 partial memory mats of L words each made of four bits, and
wherein the address selection part comprises a plurality of address decoders each outputting a selection signal selecting one word from the L words on a basis of an address supplied and each associated with a respective one of the 18 partial memory mats.

15. A microcontroller comprising, in a single chip, three or more processors and a memory having a data-system failure masking function and an address-system failure masking function,
wherein the data-system failure masking function, when a first detected failure occurs in a wire or a circuit on a path between at least one of the three or more processors and the memory while writing data to the memory or occurs in a wire or a circuit on a path between the memory and at least one of the three or more processors while reading data from the memory, masks an influence of the first detected failure so that the influence does not extend to entire operations of the microcontroller,
wherein the address-system failure masking function, when a second detected failure based on an address which is output when at least one of the three or more processors accesses the memory occurs in a wire or a circuit on a path between the at least one processor and the memory, masks an influence of the second detected failure so that the influence does not extend to entire operations of the microcontroller, and
wherein, to perform the address-system failure masking function, the memory has a plurality of redundant address decoders and a memory cell selected by a result of majority vote of outputs of the plurality of redundant address decoders.

16. The microcontroller according to claim 15,
wherein the data-system failure masking function is a 1-bit error correction 2-bit error detection code.

17. An electronic control device on which the microcontroller described in claim 15 is mounted.

18. The microcontroller according to claim 15,
wherein the memory comprises a plurality of redundant address decoders each outputting a selection signal selecting a storage region on a basis of an address supplied.

19. A microcontroller comprising, in a single chip, three or more processors and a memory having a data-system failure masking function and an address-system failure masking function, wherein the data-system failure masking function, when a first detected failure occurs in a wire or a circuit on a path between at least one of the three or more processors and the memory while writing data to the memory or occurs in a wire or a circuit on a path between the memory and at least one of the three or more processors while reading data from the memory, masks an influence of the first detected failure so that the influence does not extend to entire operations of the microcontroller, wherein the address-system failure masking function, when a second detected failure based on an address which is output when at least one of the three or more processors accesses the memory occurs in a wire or a circuit on a path between the at least one processor and the memory, masks an influence of the second detected failure so that the influence does not extend to entire operations of the microcontroller, wherein, to perform the address-system failure masking function, the memory has: a memory cell divided into a plurality of block units by bit slicing, a plurality of address decoders each corresponding to a respective one of the plurality of block units, and an error correction circuit using a Reed-Solomon code for detecting an error in a block unit, wherein the Reed-Solomon code uses a code word of c symbols (c is a natural number), wherein a number of the plurality of block units is a plural number less than or equal to c, and wherein a number of the plurality of address decoders is equal to the number of the plurality of block units.

20. The microcontroller according to claim 19,
wherein the error correction circuit is provided for each of the processors.

* * * * *